US012690031B2

(12) United States Patent
Cao et al.

(10) Patent No.: US 12,690,031 B2
(45) Date of Patent: Jul. 21, 2026

(54) CONFIGURATION FOR UPLINK TRANSMIT SWITCHING AND SOUNDING REFERENCE SIGNAL CARRIER SWITCHING

(71) Applicant: QUALCOMM Incorporated, San Diego, CA (US)

(72) Inventors: Yiqing Cao, Beijing (CN); Peter Gaal, San Diego, CA (US); Alberto Rico Alvarino, San Diego, CA (US); Enoch Shiao-Kuang Lu, San Diego, CA (US); Wanshi Chen, San Diego, CA (US); Kazuki Takeda, Minato-ku (JP); Bin Han, Beijing (CN); Yan Li, Beijing (CN); Zhimin Du, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 18/263,049

(22) PCT Filed: Mar. 12, 2021

(86) PCT No.: PCT/CN2021/080404
§ 371 (c)(1),
(2) Date: Jul. 26, 2023

(87) PCT Pub. No.: WO2022/188134
PCT Pub. Date: Sep. 15, 2022

(65) Prior Publication Data
US 2024/0080838 A1 Mar. 7, 2024

(51) Int. Cl.
*H04W 72/1268* (2023.01)
*H04L 5/00* (2006.01)
*H04W 72/0453* (2023.01)
(52) U.S. Cl.
CPC ....... *H04W 72/1268* (2013.01); *H04L 5/0051* (2013.01); *H04W 72/0453* (2013.01)

(58) Field of Classification Search
CPC .......... H04W 72/1268; H04W 72/0453; H04L 5/0051; H04L 5/0098; H04L 5/001
See application file for complete search history.

(56) References Cited

U.S. PATENT DOCUMENTS

2018/0098358 A1* 4/2018 Rico Alvarino ...... H04W 52/34
2019/0109688 A1 4/2019 Kim et al.
(Continued)

FOREIGN PATENT DOCUMENTS

CN 109478980 A 3/2019
CN 109802799 A 5/2019

OTHER PUBLICATIONS

Huawei, et al., "Specification Impacts to Support SRS Carrier Based Switching", 3GPP TSG RAN WG 1 Meeting #84bis, R1-162586, Busan, Korea, Apr. 11-15, 2016, 4 Pages, XP051080274, Retrieved from the Internet: URL: http://www.3gpp.org/ftp/tsg_ran/WG1_RL1/TSGR1_84b/Docs/, the whole document.
(Continued)

*Primary Examiner* — Yu-Wen Chang
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information that indicates an uplink transmit switching configuration for performing uplink transmit switching between a first component carrier and a second component carrier and a sounding reference signal (SRS) carrier switching configuration for performing SRS carrier switching between the second component carrier and a third component carrier, wherein the configuration information is associated with a maximum number of allowable switches over an amount of time. The UE may transmit, based at least in part on the configuration information, one or more signals associated with performing at least one of
(Continued)

700 ➞ uplink transmit switching or SRS carrier switching. Numerous other aspects are described.

35 Claims, 11 Drawing Sheets

(56)                    References Cited

U.S. PATENT DOCUMENTS

| | | | |
|---|---|---|---|
| 2019/0253214 A1* | 8/2019 | Liu | H04B 7/0413 |
| 2019/0305918 A1* | 10/2019 | Siomina | H04L 5/001 |
| 2021/0144716 A1* | 5/2021 | Choi | H04W 76/27 |
| 2021/0306916 A1* | 9/2021 | Bae | H04W 52/146 |
| 2022/0104280 A1* | 3/2022 | Yang | H04W 74/0841 |
| 2022/0116172 A1* | 4/2022 | Tang | H04L 5/0007 |
| 2022/0345286 A1* | 10/2022 | Chen | H04L 5/0007 |
| 2022/0386337 A1* | 12/2022 | Hao | H04L 5/0078 |
| 2024/0172243 A1* | 5/2024 | Wang | H04L 5/0094 |

OTHER PUBLICATIONS

International Search Report and Written Opinion—PCT/CN2021/080404—ISA/EPO—Dec. 8, 2021.

* cited by examiner

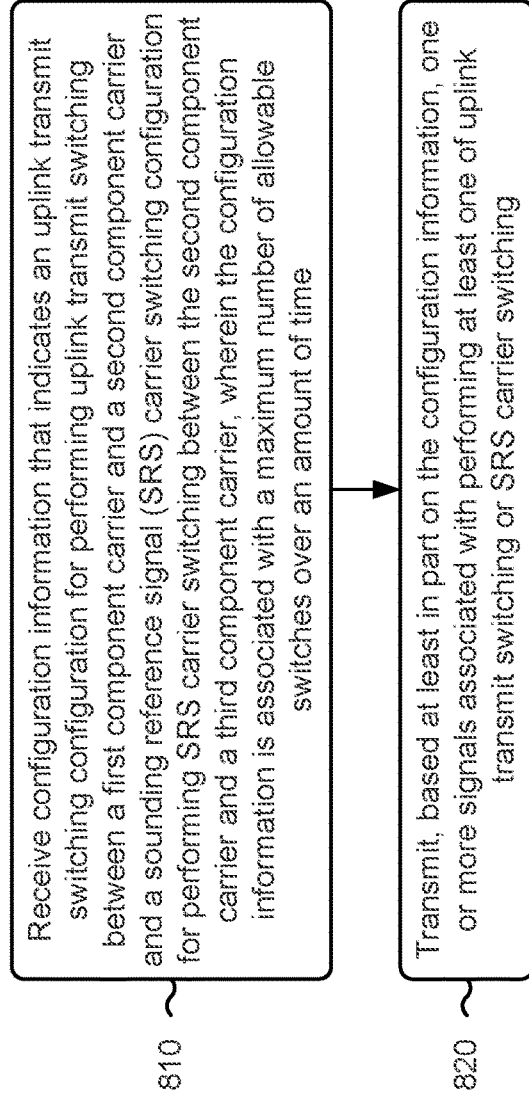

Receive configuration information that indicates an uplink transmit switching configuration for performing uplink transmit switching between a first component carrier and a second component carrier and a sounding reference signal (SRS) carrier switching configuration for performing SRS carrier switching between the second component carrier and a third component carrier, wherein the configuration information is associated with a maximum number of allowable switches over an amount of time Transmit, based at least in part on the configuration information, one or more signals associated with performing at least one of uplink transmit switching or SRS carrier switching

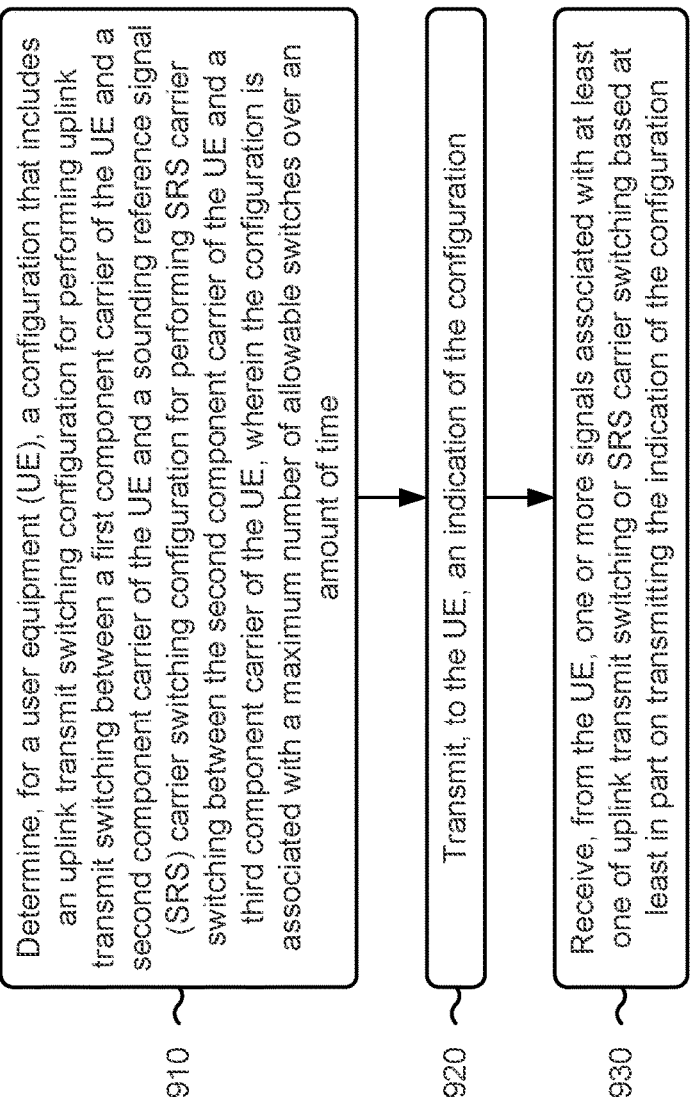

910 — Determine, for a user equipment (UE), a configuration that includes an uplink transmit switching configuration for performing uplink transmit switching between a first component carrier of the UE and a second component carrier of the UE and a sounding reference signal (SRS) carrier switching configuration for performing SRS carrier switching between the second component carrier of the UE and a third component carrier of the UE, wherein the configuration is associated with a maximum number of allowable switches over an amount of time 920 — Transmit, to the UE, an indication of the configuration 930 — Receive, from the UE, one or more signals associated with at least one of uplink transmit switching or SRS carrier switching based at least in part on transmitting the indication of the configuration

CONFIGURATION FOR UPLINK TRANSMIT SWITCHING AND SOUNDING REFERENCE SIGNAL CARRIER SWITCHING

CROSS-REFERENCE TO RELATED APPLICATION

This application is a 371 national stage of Patent Cooperation Treaty (PCT) Application No. PCT/CN2021/080404 filed on Mar. 12, 2021, entitled "CONFIGURATION FOR UPLINK TRANSMIT SWITCHING AND SOUNDING REFERENCE SIGNAL CARRIER SWITCHING," which is hereby expressly incorporated by reference herein.

FIELD OF THE DISCLOSURE

Aspects of the present disclosure generally relate to wireless communication and to techniques and apparatuses for a configuration for uplink transmit switching and sounding reference signal (SRS) carrier switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive configuration information that indicates an uplink transmit switching configuration for performing uplink transmit switching between a first component carrier and a second component carrier and a sounding reference signal (SRS) carrier switching configuration for performing SRS carrier switching between the second component carrier and a third component carrier, wherein the configuration information is associated with a maximum number of allowable switches over an amount of time; and transmit, based at least in part on the configuration information, one or more signals associated with performing at least one of uplink transmit switching or SRS carrier switching.

In some aspects, a base station for wireless communication includes a memory and one or more processors, coupled to the memory, configured to: determine, for a UE, a configuration that includes an uplink transmit switching configuration for performing uplink transmit switching between a first component carrier of the UE and a second component carrier of the UE and an SRS carrier switching configuration for performing SRS carrier switching between the second component carrier of the UE and a third component carrier of the UE, wherein the configuration is associated with a maximum number of allowable switches over an amount of time; transmit, to the UE, an indication of the configuration; and receive, from the UE, one or more signals associated with at least one of uplink transmit switching or SRS carrier switching based at least in part on transmitting the indication of the configuration.

In some aspects, a method of wireless communication performed by a UE includes receiving configuration information that indicates an uplink transmit switching configuration for performing uplink transmit switching between a first component carrier and a second component carrier and an SRS carrier switching configuration for performing SRS carrier switching between the second component carrier and a third component carrier, wherein the configuration information is associated with a maximum number of allowable switches over an amount of time; and transmitting, based at least in part on the configuration information, one or more signals associated with performing at least one of uplink transmit switching or SRS carrier switching.

In some aspects, a method of wireless communication performed by a base station includes determining, for a UE, a configuration that includes an uplink transmit switching configuration for performing uplink transmit switching between a first component carrier of the UE and a second component carrier of the UE and an SRS carrier switching configuration for performing SRS carrier switching between the second component carrier of the UE and a third component carrier of the UE, wherein the configuration is associated with a maximum number of allowable switches over an amount of time; transmitting, to the UE, an indication of the configuration; and receiving, from the UE, one or more signals associated with at least one of uplink transmit switching or SRS carrier switching based at least in part on transmitting the indication of the configuration.

In some aspects, a non-transitory computer-readable medium storing a set of instructions for wireless communication includes one or more instructions that, when executed by one or more processors of a UE, cause the UE to: receive configuration information that indicates an uplink transmit switching configuration for performing uplink transmit switching between a first component carrier and a second component carrier and an SRS carrier switching configuration for performing SRS carrier switching between the second component carrier and a third component carrier, wherein the configuration information is associated with a maximum number of allowable switches over an amount of time; and transmit, based at least in part on the configuration information, one or more signals associated with performing at least one of uplink transmit switching or SRS carrier switching.

In some aspects, a non-transitory computer-readable medium storing a set of instructions for wireless communication includes one or more instructions that, when executed by one or more processors of a base station, cause the base station to: determine, for a UE, a configuration that includes an uplink transmit switching configuration for performing uplink transmit switching between a first component carrier of the UE and a second component carrier of the UE and an SRS carrier switching configuration for performing SRS carrier switching between the second component carrier of the UE and a third component carrier of the UE, wherein the configuration is associated with a maximum number of allowable switches over an amount of time; transmit, to the UE, an indication of the configuration; and receive, from the UE, one or more signals associated with at least one of uplink transmit switching or SRS carrier switching based at least in part on transmitting the indication of the configuration.

In some aspects, an apparatus for wireless communication includes means for receiving configuration information that indicates an uplink transmit switching configuration for performing uplink transmit switching between a first component carrier and a second component carrier and an SRS carrier switching configuration for performing SRS carrier switching between the second component carrier and a third component carrier, wherein the configuration information is associated with a maximum number of allowable switches over an amount of time, and means for transmitting, based at least in part on the configuration information, one or more signals associated with performing at least one of uplink transmit switching or SRS carrier switching.

In some aspects, an apparatus for wireless communication includes means for determining, for a UE, a configuration that includes an uplink transmit switching configuration for performing uplink transmit switching between a first component carrier of the UE and a second component carrier of the UE and an SRS carrier switching configuration for performing SRS carrier switching between the second component carrier of the UE and a third component carrier of the UE, wherein the configuration is associated with a maximum number of allowable switches over an amount of time; means for transmitting, to the UE, an indication of the configuration; and means for receiving, from the UE, one or more signals associated with at least one of uplink transmit switching or SRS carrier switching based at least in part on transmitting the indication of the configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8 and 9 are diagrams illustrating example processes associated with a configuration for uplink transmit switching and SRS carrier switching, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
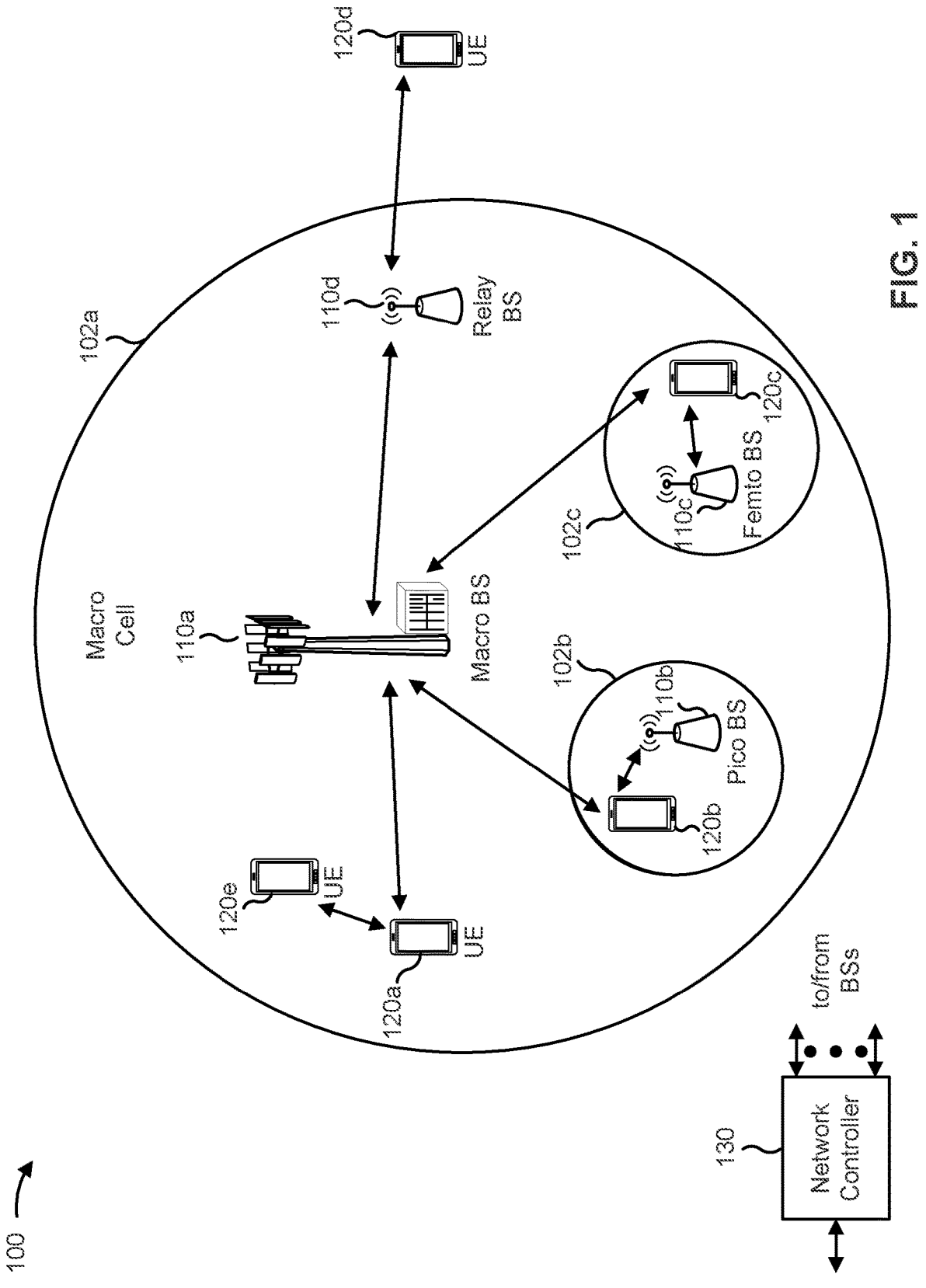
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS)

is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*. 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
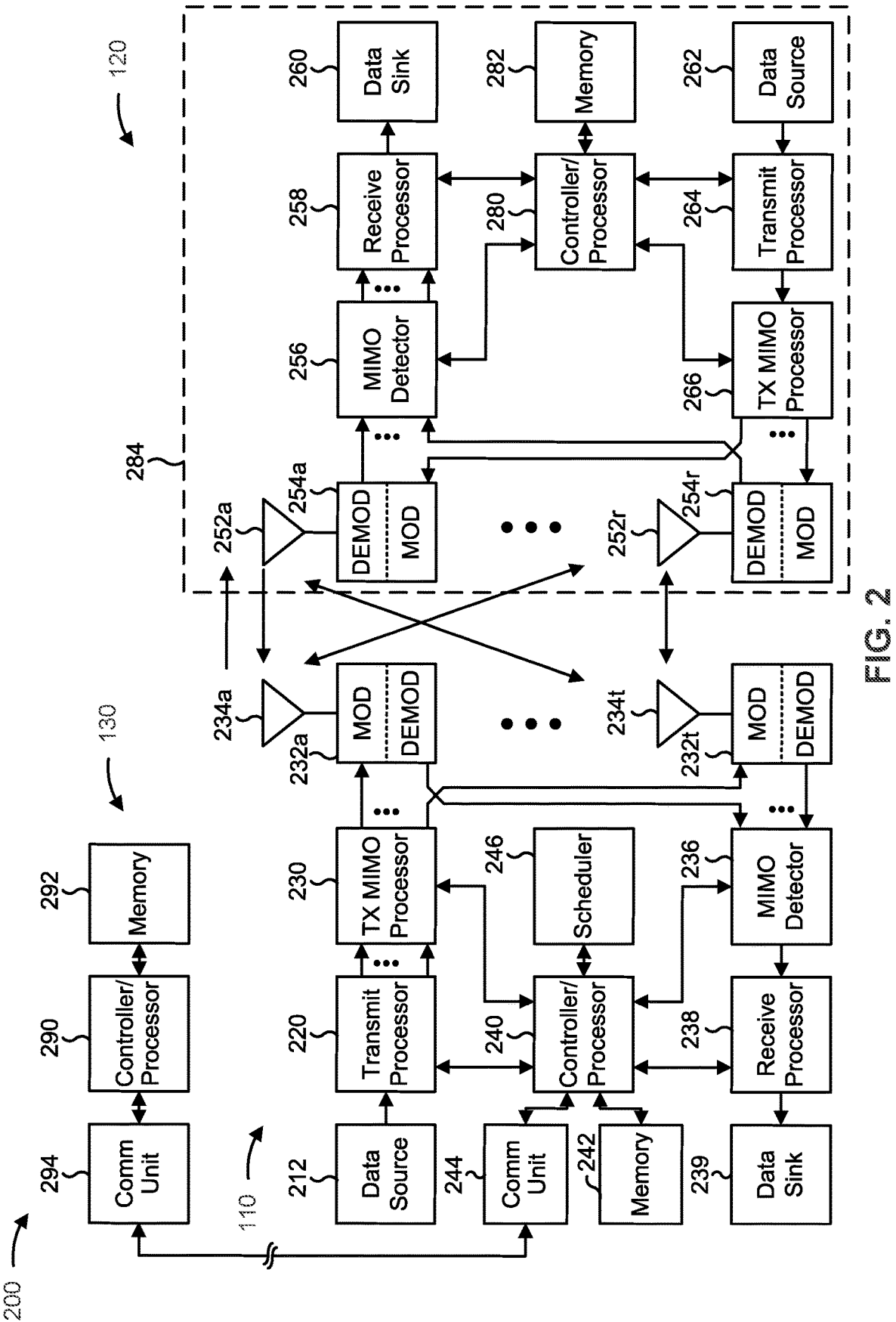
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 7-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 7-9).

Controller/processor 240 of base station 110, controller/processor 280 of UE 120, and/or any other component(s) of FIG. 2 may perform one or more techniques associated with a configuration for uplink transmit switching and sounding reference signal (SRS) carrier switching, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE 120 includes means for receiving configuration information that indicates an uplink transmit switching configuration for performing uplink transmit switching between a first component carrier and a second component carrier and an SRS carrier switching configuration for performing SRS carrier switching between the second component carrier and a third component carrier, wherein the configuration information is associated with a maximum number of allowable switches over an amount of time; and/or means for transmitting, based at least in part on the configuration information, one or more signals associated with performing at least one of uplink transmit switching or SRS carrier switching. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for transmitting a capability message indicating a number of switches that the UE is capable of performing over the amount of time.

In some aspects, the UE 120 includes means for transmitting an indication of at least one of: a capability to support more than three switches over the amount of time, or a capability to support two uplink transmit switches and one SRS switch over the amount of time.

In some aspects, the UE 120 includes means for receiving an indication that the third component carrier is associated with two ports for SRS carrier switching.

In some aspects, the UE 120 includes means for receiving an indication that uplink transmit switching is scheduled to occur at a same time as SRS carrier switching; and means for detecting an error event based at least in part on receiving the indication that uplink transmit switching is scheduled to occur at the same time as SRS carrier switching.

In some aspects, the UE 120 includes means for transmitting a capability message indicating that the UE is capable of performing uplink transmit switching while performing SRS carrier switching.

In some aspects, the base station 110 includes means for determining, for a UE (e.g., the UE 120), a configuration that includes an uplink transmit switching configuration for performing uplink transmit switching between a first component carrier of the UE and a second component carrier of the UE and an SRS carrier switching configuration for performing SRS carrier switching between the second component carrier of the UE and a third component carrier of the UE, wherein the configuration is associated with a maximum number of allowable switches over an amount of time; means for transmitting, to the UE, an indication of the configuration; and/or means for receiving, from the UE, one or more signals associated with at least one of uplink transmit switching or SRS carrier switching based at least in part on transmitting the indication of the configuration. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for determining a number of switches that the UE is to perform over the amount of time, such that the number of switches does not exceed the maximum number of allowable switches over the amount of time, wherein the switches that the UE is to perform include at least one of uplink transmit switching or SRS carrier switching.

In some aspects, the base station 110 includes means for receiving, from the UE, a capability message indicating a number of switches that the UE is capable of performing over the amount of time.

In some aspects, the base station 110 includes means for determining a number of switches for the UE based at least in part on the number of switches that the UE is capable of performing over the amount of time.

In some aspects, the base station 110 includes means for receiving an indication of at least one of: a capability of the UE to support more than three switches over the amount of time, or a capability of the UE to support two uplink transmit switches and one SRS switch over the amount of time.

In some aspects, the base station 110 includes means for transmitting an indication that the third component carrier is associated with two ports for SRS carrier switching.

In some aspects, the base station 110 includes means for receiving a capability message indicating that the UE is capable of performing uplink transmit switching while performing SRS carrier switching.

In some aspects, the base station 110 includes means for transmitting an indication to schedule the UE to perform uplink transmit switching at a same time that the UE is scheduled to perform SRS carrier switching.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
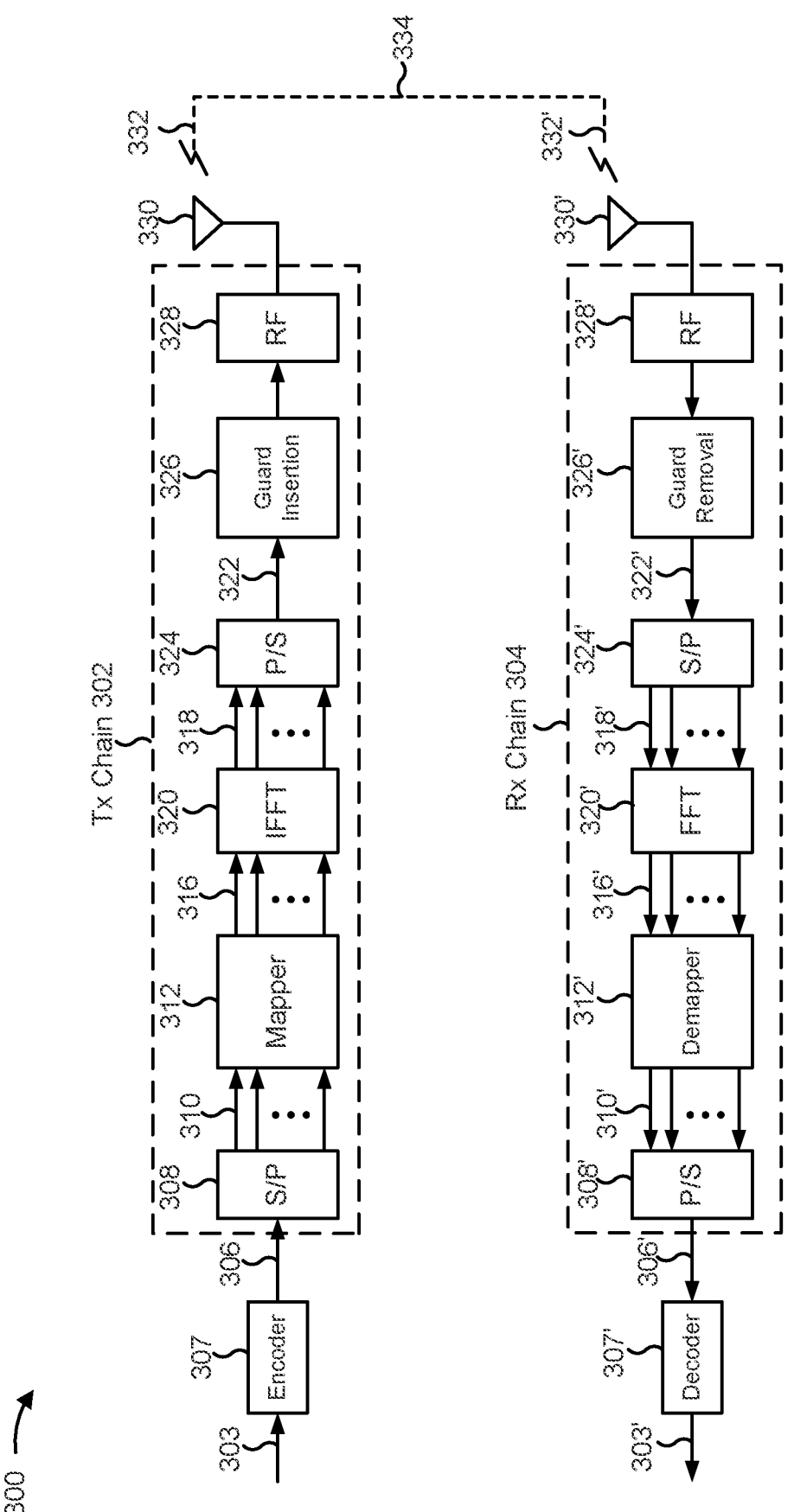
FIG. 3 is a diagram illustrating an example of a transmit (Tx) chain and a receive (Rx) chain of a UE, in accordance with the present disclosure.

FIG. 3 is a diagram illustrating an example 300 of a transmit (Tx) chain 302 and a receive (Rx) chain 304 of a UE 120, in accordance with the present disclosure. In some aspects, one or more components of Tx chain 302 may be implemented in transmit processor 264, TX MIMO processor 266. MOD/DEMOD 254, and/or controller/processor 280, as described above in connection with FIG. 2. In some aspects, Tx chain 302 may be implemented in UE 120 for transmitting data 306 (e.g., uplink data, an uplink reference signal, and/or uplink control information) to base station 110 on an uplink channel. In some cases, a UE 120 may include multiple Tx chains. For example, the UE may be configured to use a first Tx chain 302 for a first frequency (e.g., and/or for a first component carrier) and a second Tx chain 302 for a second frequency (e.g., and/or for a second component carrier). In some aspects, a UE 120 may be enabled to switch a Tx chain 302 from one frequency (e.g., from one component carrier) to another frequency (e.g., to another component carrier). Switching the Tx chain 302 may include tuning one or more components of the Tx chain 302 (e.g., as described herein) to a different frequency.

An encoder 307 may alter a signal (e.g., a bitstream) 303 into data 306. Data 306 to be transmitted is provided from encoder 307 as input to a serial-to-parallel (S/P) converter 308. In some aspects, S/P converter 308 may split the transmission data into N parallel data streams 310.

The N parallel data streams 310 may then be provided as input to a mapper 312. Mapper 312 may map the N parallel data streams 310 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 312 may output N parallel symbol streams 316, each symbol stream 316 corresponding to one of N orthogonal subcarriers of an inverse fast Fourier transform (IFFT) component 320. These N parallel symbol streams 316 are represented in the frequency domain and may be converted into N parallel time domain sample streams 318 by IFFT component 320.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of guard insertion component 326 may then be upconverted to a desired transmit frequency band by a radio frequency (RF) front end 328. An antenna 330 may then transmit the resulting signal 332.

In some aspects, Rx chain 304 may utilize OFDM/ OFDMA. In some aspects, one or more components of Rx chain 304 may be implemented in receive processor 258, MIMO detector 256, MOD/DEMOD 254, and/or controller/ processor 280, as described above in connection with FIG. 2. In some aspects, Rx chain 304 may be implemented in UE 120 for receiving data 306 (e.g., downlink data, a downlink reference signal, and/or downlink control information) from base station 110 on a downlink channel.

A transmitted signal 332 is shown traveling over a wireless channel 334 from Tx chain 302 to Rx chain 304. When a signal 332' is received by an antenna 330', the received signal 332' may be down-converted to a baseband signal by an RF front end 328'. A guard removal component 326' may then remove the guard interval that was inserted between OFDM/OFDMA symbols by guard insertion component 326.

The output of guard removal component 326' may be provided to an S/P converter 324'. The output may include an OFDM/OFDMA symbol stream 322', and S/P converter 324' may divide the OFDM/OFDMA symbol stream 322' into N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by mapper 312, thereby outputting N parallel data streams 310'. A P/S converter 308' may combine the N parallel data streams 310' into a single data stream 306'. Ideally, data stream 306' corresponds to data 306 that was provided as input to Tx chain 302. Data stream 306' may be decoded into a decoded data stream 303' by decoder 307'.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4:
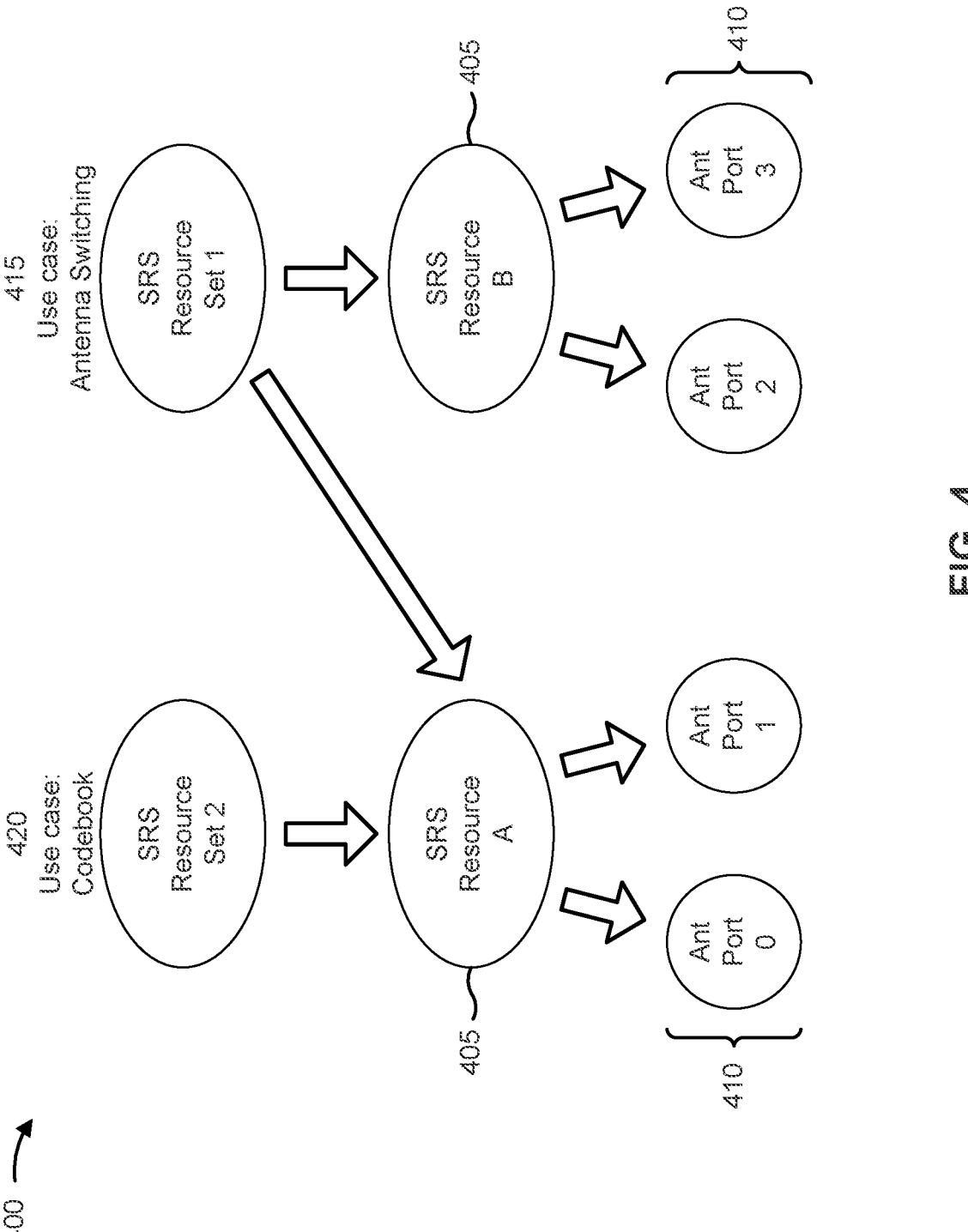
FIG. 4 is a diagram illustrating an example of sounding reference signal (SRS) resource sets, in accordance with the present disclosure.

FIG. 4 is a diagram illustrating an example 400 of sounding reference signal (SRS) resource sets, in accordance with the present disclosure. A base station 110 may configure a UE 120 with one or more SRS resource sets to allocate resources for SRS transmissions by the UE 120. For example, a configuration for SRS resource sets may be indicated in a radio resource control (RRC) message (e.g., an RRC configuration message or an RRC reconfiguration message). As shown by reference number 405, an SRS resource set may include one or more resources (e.g., shown as SRS resources), which may include time resources and/or frequency resources (e.g., a slot, a symbol, a resource block, and/or a periodicity for the time resources).

As shown by reference number 410, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, or beam management.

An antenna switching SRS resource set may be used to indicate downlink channel state information (CSI) with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder to be used to communicate with the UE 120). In some aspects, an antenna switching SRS may be associated with switching between two component carriers of the UE 120 (e.g., as described in more detail below). For example, an antenna switching SRS may be associated with an SRS carrier switching procedure.

A codebook SRS resource set may be used to indicate uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110). In some aspects, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the base station 110 indicated an uplink precoder to be used by the UE 120. For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station 110). A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using downlink control information (DCI) or a medium access control (MAC) control element (CE) (MAC-CE)). An aperiodic SRS resource may be triggered dynamically, such as via DCI (e.g., UE-specific DCI or group common DCI) or a MAC-CE.

In some aspects, the UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span M adjacent symbols within a slot (e.g., where M equals 1, 2, or 4). The UE 120 may be configured with X SRS ports (e.g., where X≤4). In some aspects, each of the X SRS ports may mapped to a corresponding symbol of the SRS resource and used for transmission of an SRS in that symbol.

As shown in FIG. 4, in some aspects, different SRS resource sets indicated to the UE 120 (e.g., having different use cases) may overlap (e.g., in time and/or in frequency, such as in the same slot). For example, as shown by reference number 415, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 420, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

As indicated above, FIG. 4 is provided as an example. Other examples may differ from what is described with regard to FIG. 4.

Figure 5:
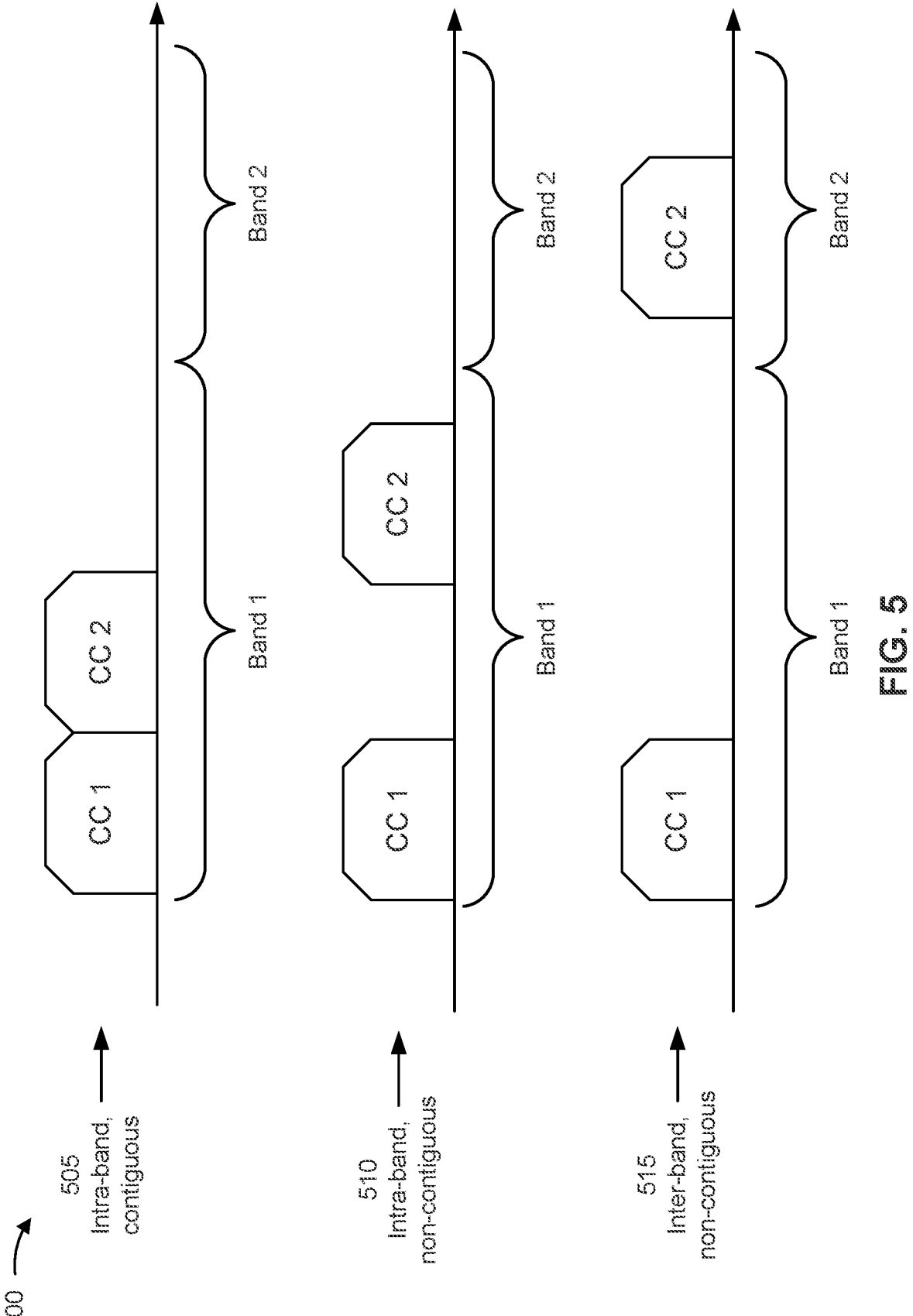
FIG. 5 is a diagram illustrating examples of carrier aggregation, in accordance with the present disclosure.

FIG. 5 is a diagram illustrating examples 500 of carrier aggregation, in accordance with the present disclosure. Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally. or alternatively, contiguous or non-contiguous carriers can be combined. A base station 110 may configure carrier aggregation for a UE 120, such as in an RRC message, downlink control information (DCI), and/or another signaling message.

As shown by reference number 505, in some aspects, carrier aggregation may be configured in an intra-band contiguous mode where the aggregated carriers are contiguous to one another and are in the same band. As shown by reference number 510, in some aspects, carrier aggregation may be configured in an intra-band non-contiguous mode where the aggregated carriers are non-contiguous to one another and are in the same band. As shown by reference number 515, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may, be referred to as self-carrier scheduling or carrier self-scheduling.

As indicated above, FIG. 5 is provided as an example. Other examples may differ from what is described with regard to FIG. 5.

Figure 6:
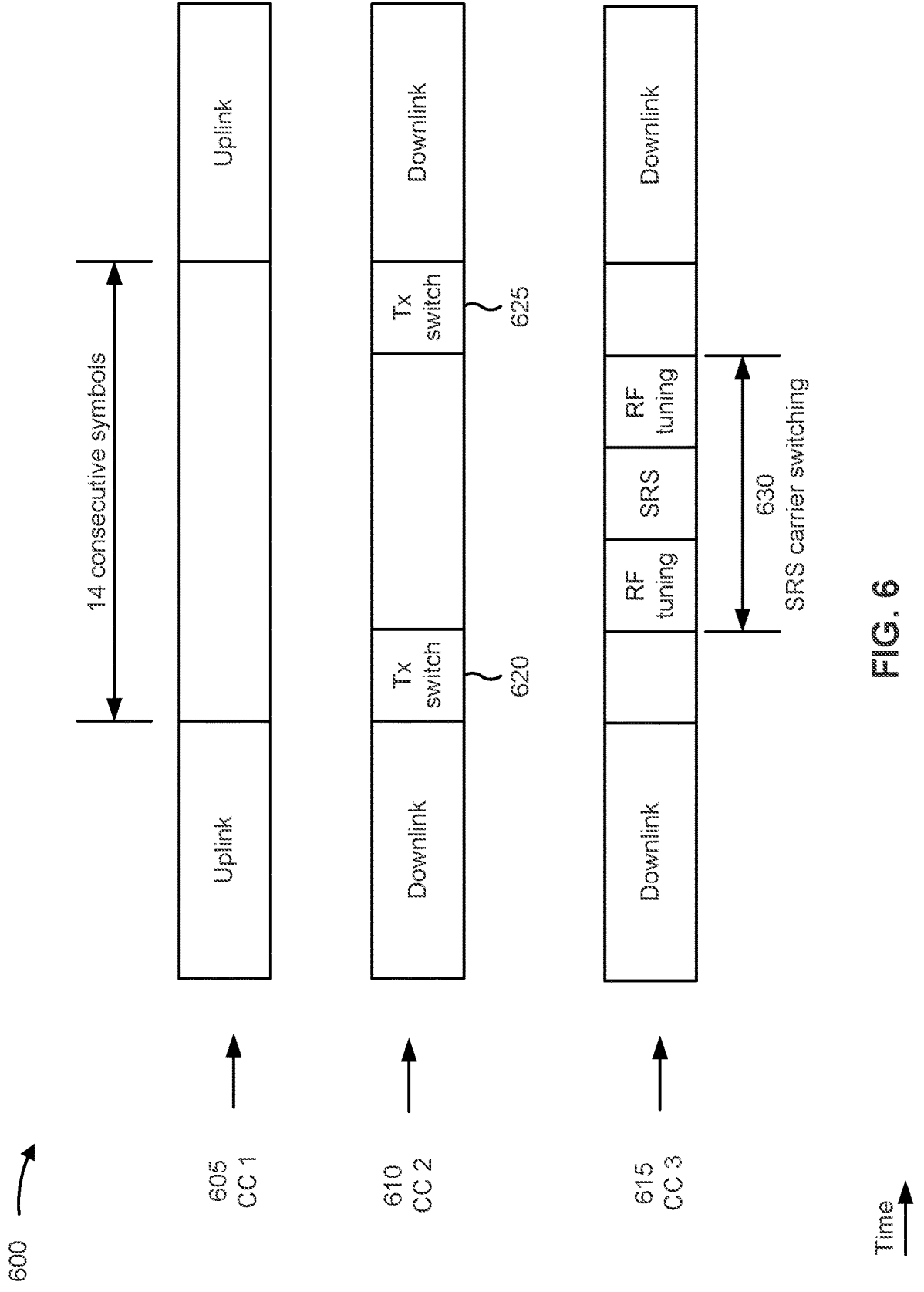
FIG. 6 is a diagram illustrating an example of uplink transmit switching and SRS carrier switching, in accordance with the present disclosure.

FIG. 6 is a diagram illustrating an example 600 of uplink transmit switching and SRS carrier switching, in accordance with the present disclosure. As shown in FIG. 6, a UE may be configured with a first component carrier 605 (CC 1), a second component carrier 610 (CC 2), and a third component carrier 615 (CC 3).

In some cases, the UE may be configured to perform uplink transmit switching (e.g., uplink carrier switching) across multiple component carriers. "Uplink transmit switching" or "uplink carrier switching" may refer to a UE switching a Tx chain from a first component carrier (e.g., associated with a first band) to a second component carrier (e.g., associated with a second band). For example, the UE may be configured to transmit an uplink transmission on a first component carrier (e.g., the first component carrier 605), may switch a Tx chain of the UE from the frequency of the first component carrier 605 to the frequency of a second component carrier (e.g., the second component carrier 610) to transmit another uplink transmission, and/or switch a Tx chain of the UE from the frequency of the second component carrier 610 to the frequency of the first component carrier 605 to transmit another uplink transmission. The uplink transmission(s) may include one or more physical uplink control channel (PUCCH) communications, one or more physical uplink shared channel (PUSCH) communications, one or more SRSs, one or more CSI reports, and/or other types of uplink communications.

For example, as shown by reference number 620, the UE may switch a Tx chain of the UE from the frequency of the first component carrier 605 to the frequency of the second component carrier 610 to transmit an uplink transmission on the second component carrier 610. As shown by reference number 625, the UE may switch a Tx chain of the UE from the frequency of the second component carrier 610 to the frequency of the first component carrier 605 to transmit an uplink transmission on the first component carrier 605.

In some cases, the UE may be associated with two Tx chains. For example, due to thermal limitations and/or power consumption limitations, the UE may be limited to two Tx chains. In some cases, such as in an inter-band carrier aggregation scenario, a first Tx chain may be associated with a first band and a second Tx chain may be associated with a second band (e.g., where there are two bands in the inter-band carrier aggregation scenario). In some cases, the second component carrier 610 may include a time division duplexed (TDD) component carrier. In some cases, the TDD frequency carrier (e.g., the second component carrier 610) may be a high-frequency carrier, such as a frequency carrier included in a millimeter wave frequency band. The TDD frequency carrier may be a frequency carrier on which uplink resources (e.g., slots, symbols, and/or subframes) and downlink resources (e.g., slots, symbols, and/or subframes) are time division duplexed. A base station may configure the UE to perform uplink transmit switching (e.g., uplink carrier switching) to enable uplink MIMO on a PCell, for example (e.g., on a TDD frequency carrier with a high frequency).

In some cases, a first Tx chain of the UE may be a fixed Tx chain. "Fixed Tx chain" may refer to a Tx chain that is fixed to, or associated with, a single component carrier. In some cases, a second Tx chain of the UE may be a flexible Tx chain. "Flexible Tx chain" may refer to a Tx chain that may be switched between component carriers or that is configured to be switched between different operating frequencies. For example, in some cases, a first Tx chain of the UE may be a fixed Tx chain and may be associated with the second component carrier 610 and a second Tx chain of the UE may be a flexible Tx chain that is capable of switching between the first component carrier 605 and the second component carrier 610.

In some cases, the UE may be configured to perform SRS carrier switching. SRS carrier switching enables the UE to transmit an SRS in a TDD secondary cell (SCell) for which there is no uplink configured. For example, some carriers may only be configured for downlink communications. Because downlink and uplink carriers are reciprocal in TDD cells, it may be helpful for channel estimation to configure the UE to transmit SRS on such a TDD cell (referred to herein as a "SRS-SCell" or a "TDD serving cell without PUSCH/PUCCH transmission") configured only for downlink. SRS carrier switching may be used for sounding carriers for which PUCCH/PUSCH is not configured, but on which uplink symbols can be sent. In that case, the UE is not transmitting an SRS for uplink purposes because no physical uplink shared channel and physical uplink control channel (PUSCH/PUCCH) is transmitted. However, in TDD operations, knowledge of the uplink channel may be useful to the network so that it can beamform accordingly (using reciprocity) in the downlink. Therefore, "SRS carrier switching" may refer to a UE switching a transmit chain to a component carrier that is configured only for downlink to enable the UE to transmit an SRS on the component carrier.

For example, the third component carrier 615 may be a TDD component carrier associated with the second component carrier 610 for only downlink traffic. The SRS transmitted on the third component carrier 615 may be used for beamforming or channel estimation of the configured downlink channel due to the reciprocal relationship. The UE may switch or retune one of its radio frequency (RF) Tx chains to the SRS-SCell (e.g., to a frequency associated with the third component carrier 615), which may create an interruption in a different SCell/PCell for the switched SRS transmission.

For example, as shown by reference number 630, the UE may perform SRS carrier switching. The SRS carrier switching may include the UE may perform RF tuning to tune a Tx chain from a frequency associated with the second component carrier 610 to a frequency associated with the third component carrier 615. The UE may transmit one or more SRSs on the third component carrier 615. The UE may perform RF tuning (e.g., retuning) to tune a Tx chain from the frequency associated with the third component carrier 615 to the frequency associated with the second component carrier 610. Therefore, SRS carrier switching may include two RF tunings as described above.

In some cases, the UE may be configured with both uplink transmit switching (e.g., uplink carrier switching) and SRS carrier switching. However, as described above, Tx chains of the UE may be fixed Tx chains or flexible Tx chains. Therefore, if a flexible Tx chain is being used for SRS carrier switching transmissions, the UE may be unable to switch to another component carrier even if the UE is only using a single port (e.g., a single antenna port and/or a single SRS port) for the SRS transmission. For example, the UE may include two Tx chains with a first TX chain fixed to the second component carrier 610 and a second Tx chain a flexible Tx chain. If the UE is using the flexible Tx chain for the SRS carrier switching procedure, then the UE may be unable to switch a Tx chain to the first component carrier 605 while performing the SRS carrier switching procedure (e.g., as the only remaining Tx chain is fixed to the second component carrier 610). As a result, the UE may be unable to transmit uplink communications on the first component carrier 605 and may drop or fail to transmit a scheduled uplink transmission on the first component carrier 605.

Additionally, the UE may be configured with uplink transmit switches that are close together in time. For example, the UE may be enabled to perform two uplink transmit switches within fourteen consecutive symbols (e.g., as shown in FIG. 6 and/or as defined, or otherwise fixed, by the 3GPP). Moreover, during the same fourteen consecutive symbols, the UE may be configured to perform an SRS carrier switching procedure. As a result, the UE may be configured to perform two uplink transmit switches (e.g., which include time gaps to enable the UE to switch a Tx chain, as described above) and an SRS carrier switch (e.g., that includes an RF tuning time and an RF retuning time) within fourteen consecutive symbols. This results in a significant switching overhead during a short amount of time, thereby wasting significant network resources (e.g., time and/or frequency resources). "Switching overhead" may refer to time during which the UE cannot transmit and/or receive communications due to tuning or switching a Tx chain of the UE. For example, the UE may take an amount of time (e.g., one or more OFDM symbols) to tune or switch a Tx chain from one component carrier to another. During that time, the UE is unable to transmit communications using that Tx chain. As a result, by allowing two uplink transmit switches (e.g., each associated with one or more OFDM symbols associated with a switching time during which the UE 120 cannot transmit and/or receive communications) and an SRS carrier switch (e.g., associated with one or more symbols for an RF tuning time and one or more symbols for an RF retuning time during which the UE 120 cannot transmit and/or receive communications) within fourteen consecutive symbols, the UE consumes significant resources associated with the switching overhead.

Some techniques and apparatuses described herein enable a configuration for uplink transmit switching and SRS carrier switching that addresses one or more (or all) of the problems described above. For example, the configuration may indicate that the third component carrier (e.g., associated with SRS carrier switching) is to be considered (e.g., treated as by the UE) as a two port SRS carrier regardless of the number of configured SRS ports. For example, the third component carrier (e.g., associated with SRS carrier switching) may be configured with a two port SRS configuration even if only one port is used by the UE for an SRS transmission. As a result, the UE may not be configured to perform uplink transmit switching during the SRS carrier switching as the third component carrier is configured with a two port configuration (e.g., indicating that a second port is not available for uplink transmit switching during the SRS carrier switching). In some aspects, if the UE is associated with multiple flexible RF chains, then the UE may transmit an indication of the capability to use multiple flexible RF chains. The indication of the capability to use multiple flexible RF chains may enable the UE to be configured to perform uplink transmit switching while also performing SRS carrier switching as the risk of a single flexible Tx chain being used for SRS carrier switching (e.g., an therefore being unavailable for uplink transmit switching) is eliminated.

Additionally, or alternatively, the configuration may be associated with a maximum number of switches over an amount of time. A "switch" may refer to an uplink transmit switch (e.g., between the first component carrier and the second component carrier) and/or an RF tuning for an SRS carrier switch (e.g., between the second component carrier and the third component carrier). For example, the amount of time may be fourteen consecutive symbols and/or one slot (e.g., a duration of the symbols and/or slot may be based at least in part on a symbol duration of a configured component carrier with the lowest subcarrier spacing). In some aspects, the maximum number of switches may be three switches (e.g., one uplink transmit switch and two RF tunings for an SRS carrier switch). In some aspects, the maximum number of switches may be two uplink transmit switches. In some aspects, the UE may transmit an indication of a capability to support more than the maximum number of switches. In that case, the UE may be configured with more than the maximum number of switches over the amount of time.

As a result, the UE may be configured with a maximum number of switches when the UE is configured with both an uplink transmit switching configuration and an SRS carrier switching configuration. This reduces a switching overhead of the UE and conserves network resources. Additionally, or alternatively, the configuration may ensure that the UE is not configured to perform uplink transmit switching during a time associated with SRS carrier switching. As a result, the UE may not be configured to transmit uplink communications on one component carrier that would have otherwise been dropped or failed to transmit due to the UE performing SRS carrier switching on another component carrier.

As indicated above, FIG. 6 is provided as an example. Other examples may differ from what is described with regard to FIG. 6.

Figure 7:
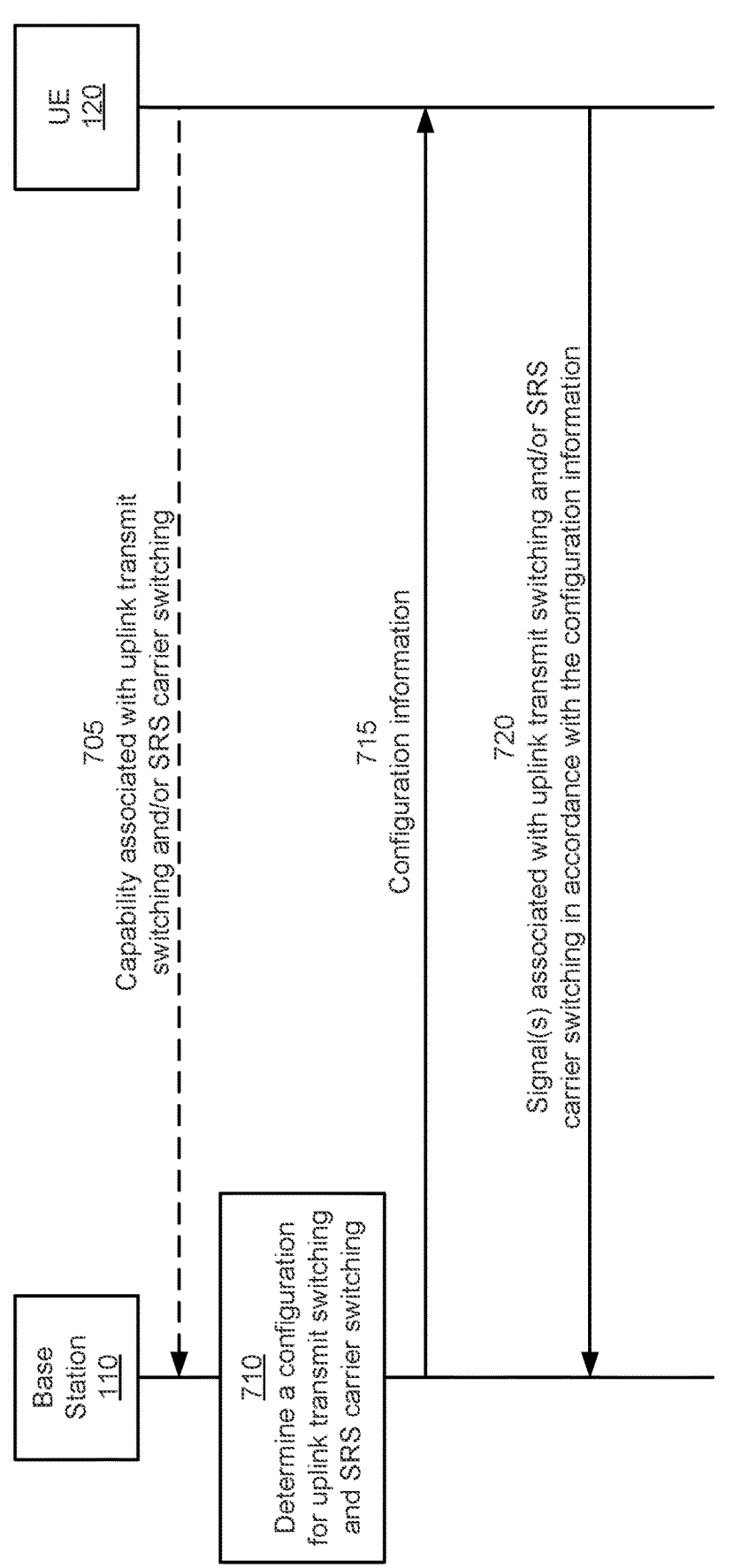
FIG. 7 is a diagram illustrating an example associated with a configuration for uplink transmit switching and SRS carrier switching, in accordance with the present disclosure.

FIG. 7 is a diagram illustrating an example 700 associated with a configuration for uplink transmit switching and SRS carrier switching, in accordance with the present disclosure. As shown in FIG. 7, a base station 110 and a UE 120 may communicate with one another in a wireless network, such as wireless network 100. In some aspects, the UE 120 may be configured with multiple component carriers (e.g., as described above in connection with FIGS. 5 and 6). For example, the UE 120 may be configured with a first component carrier, a second component carrier, and a third component carrier (e.g., in a similar manner as described above in connection with FIG. 6). For example, the third component carrier may be configured only for downlink communications (e.g., may not be configured with a PUCCH and/or a PUSCH).

As shown by reference number 705, the UE 120 may transmit, and the base station 110 may receive, a message (e.g., a capability message) indicating a capability of the UE 120. The capability of the UE 120 may be associated with uplink transmit switching and/or SRS carrier switching, among other examples. In some aspects, the UE 120 may determine one or more capabilities of the UE 120 associated with uplink transmit switching and/or SRS carrier switching, among other examples.

For example, the capability of the UE 120 may be associated with a number of switches (e.g., uplink transmit switches and/or SRS carrier switches) that can be supported by the UE 120. For example, there may be a maximum number of allowable switches (e.g., uplink transmit switches and/or SRS carrier switches) over an amount of time (e.g., fourteen consecutive OFDM symbols and/or one slot) that the UE 120 expects to be configured with (e.g., as described in more detail below). In some aspects, the UE 120 may be capable of supporting more switches over the amount of time than the maximum number of allowable switches.

Therefore, the UE 120 may transmit, to the base station 110, an indication that the UE 120 is capable of supporting more switches over the amount of time than the maximum number of allowable switches. In some aspects, the UE 120 may transmit, to the base station 110, an indication of the number of allowable switches that can be supported by the UE 120 (e.g., that is different than and/or greater than the maximum number of allowable switches).

As another example, the capability of the UE 120 may be associated with a Tx chain configuration of the UE 120. For example, the UE 120 may be configured with multiple flexible Tx chains (e.g., the capability may indicate that the UE 120 is capable of using multiple flexible Tx chains for uplink transmit switching and/or SRS carrier switching). The capability of the UE 120 to support multiple flexible Tx chains for uplink transmit switching and/or SRS carrier switching may indicate that the UE 120 is capable of performing uplink transmit switching (e.g., between a first component carrier of the UE 120 and a second component carrier of the UE 120) and SRS carrier switching (e.g., between the second component carrier of the UE 120 and a third component carrier of the UE 120) at the same time (e.g., at least partially the same time). For example, if the UE 120 supports multiple flexible Tx chains, then if one flexible Tx chain has been switched to the third component carrier for an SRS carrier switching procedure, then a second flexible Tx chain may still be available to be switched to the first component carrier for an uplink transmit switching procedure.

As shown by reference number 710, the base station 110 may determine a configuration that includes an uplink transmit switching configuration for performing uplink transmit switching between the first component carrier of the UE 120 and the second component carrier of the UE 120 and an SRS carrier switching configuration for performing SRS carrier switching between the second component carrier of the UE 120 and the third component carrier of the UE 120. The configuration may configure one or more uplink transmit switches and/or one or more SRS carrier switches to be performed by the UE 120. In some aspects, the base station 110 may determine the configuration based at least in part on one or more rules and/or one or more restrictions associated with a UE 120 that is configured with both uplink transmit switching and SRS carrier switching. In some aspects, the one or more rules and/or one or more restrictions may be defined, or otherwise fixed, by a wireless communication standard, such as a 3GPP Specification.

In some aspects, the one or more rules and/or one or more restrictions may include that the UE 120 is not to be configured with an uplink transmit switching procedure at the same time as (or at a time that at least partially overlaps with) an SRS carrier switching procedure (e.g., that includes transmitting an SRS, an RF tuning time, and an RF retuning time). For example, the base station 110 may determine that the SRS carrier switching configuration includes configuring the third component carrier with two ports (e.g., two antenna ports, two SRS ports, and/or two Tx chains) for an SRS carrier switching procedure regardless of a number of ports that are actually to be used by the UE 120. For example, the base station 110 may configure the third component carrier to be associated with two ports (e.g., two antenna ports, two SRS ports, and/or two Tx chains) for an SRS carrier switching procedure even if only one port (e.g., one antenna port, one SRS port, and/or one Tx chain) is to be used by the UE 120 for the SRS carrier switching procedure. In this way, the configuration ensure that an uplink transmit switching procedure is not scheduled and/or configured to occur at the same time as (or at a time that at least partially overlaps with) the SRS carrier switching procedure. Therefore, the UE 120 may not be configured to perform uplink transmit switching during the SRS carrier switching procedure as the third component carrier is configured with a two port configuration (e.g., indicating that a second port and/or a second Tx chain is not available for uplink transmit switching during the SRS carrier switching procedure).

In some aspects, the UE 120 may receive an indication that uplink transmit switching is scheduled to occur at the same time as SRS carrier switching. In that case, the UE 120 may detect or determine an error event based at least in part on receiving the indication that uplink transmit switching is scheduled to occur at the same time as SRS carrier switching. An error event may indicate that the one or more rules and/or one or more restrictions (e.g., as described elsewhere herein) have been violated or have not been met. Based at least in part on detecting the error event, the UE 120 may refrain from performing the uplink transmit switching and/or the SRS carrier switching (e.g., to ensure that the one or more rules and/or one or more restrictions are met). In some aspects, the UE 120 may be configured to proceed with performing the uplink transmit switching and/or the SRS carrier switching based at least in part on detecting the error event.

As a result, the configuration may ensure that the UE 120 is not configured to perform uplink transmit switching during a time associated with SRS carrier switching. As a result, the UE 120 may not be configured to transmit uplink communications on one component carrier (e.g., the first component carrier) that would have otherwise been dropped or failed to transmit due to the UE performing SRS carrier switching on another component carrier (e.g., the third component carrier).

As described above, a switch may include an uplink transmit switch (e.g., switching a Tx chain between the first component carrier and the second component carrier) and/or an SRS carrier switch (e.g., switching a Tx chain between the second component carrier and the third component carrier). In some aspects, an SRS carrier switching procedure may be associated with two switches, as used herein. For example, an SRS carrier switching procedure may be associated with a first switch associated with tuning RF components of the UE 120 (e.g., from the second component carrier to the third component carrier) and a second switch associated with tuning (or retuning) RF components of the UE 120 (e.g., from the third component carrier to the second component carrier). Therefore, a switch, as used herein, may refer to an uplink transmit switch and/or an RF tuning associated with an SRS carrier switch.

In some aspects, the one or more rules and/or one or more restrictions may include that the configuration is associated with a maximum number of allowable switches over an amount of time. For example, the UE 120 may not be expected to be configured with more than the maximum number of allowable switches over the amount of time. For example, the base station 110 may determine a number of switches that the UE 120 is to perform over the amount of time, such that the number of switches does not exceed the maximum number of allowable switches over the amount of time (e.g., where the switches that the UE 120 is to perform include at least one of uplink transmit switching or SRS carrier switching).

In some aspects, the amount of time is associated with a number of symbols (e.g., a number of OFDM symbols). In some aspects, the amount of time is associated with fourteen consecutive symbols (e.g., fourteen consecutive OFDM symbols). In some aspects, the amount of time is associated with one slot (e.g., the amount of time may be equivalent to a duration of a slot). For example, the amount of time may span over two slots (e.g., starting at a time after the start of a first slot and ending at a time after the start of a second slot) but may be equivalent to the duration of a single slot. In some aspects, the amount of time is based at least in part on a symbol duration of a component carrier, among the first component carrier, the second component carrier, or the third component carrier, with a lowest subcarrier spacing (e.g., if the subcarrier spacings of the component carriers are different). For example, the amount of time may be determined based at least in part on a symbol duration or a slot duration of a component carrier (e.g., on the UE 120) with the lowest subcarrier spacing.

In some aspects, the maximum number of allowable switches may be three switches. For example, the maximum number of allowable switches may indicate that the UE 120 may be configured with one uplink transmit switch and one SRS carrier switch (e.g., that includes two RF tunings) over the amount of time. For example, the UE 120 may not be expected to be configured with more than three switches (e.g., three Tx switches) within 14 consecutive OFDM symbols.

In some aspects, the maximum number of allowable switches may indicate a maximum number of uplink transmit switches between the first component carrier and the second component carrier over the amount of time. For example, the UE 120 may not be expected to be configured with more than the maximum number of uplink transmit switches between the first component carrier and the second component carrier within the amount of time (e.g., 14 consecutive OFDM symbols and/or one slot). In some aspects, the maximum number of uplink transmit switches over the amount of time may be one or two (e.g., depending on whether an SRS carrier switching procedure is also configured). For example, the maximum number of uplink transmit switches over the amount of time may one (e.g., when SRS carrier switching is also configured and/or when an SRS carrier switching procedure is also configured or scheduled during the amount of time). If SRS carrier switching is not configured and/or when if an SRS carrier switching procedure is not configured or scheduled during the amount of time, then the maximum number of uplink transmit switches over the amount of time may be two. The maximum number of allowable switches may be defined, or otherwise fixed, by a wireless communication standard, such as a 3GPP Specification.

By defining the maximum number of allowable switches that the UE 120 may be configured with, a switching overhead may be reduced for the UE 120. For example, the UE 120 may be configured with the maximum number of switches when the UE 120 is configured with both an uplink transmit switching configuration and an SRS carrier switching configuration to reduce the switching overhead of the UE 120 and conserve network resources. For example, this ensures that the UE 120 does not consume multiple OFDM symbols (e.g., associated with guard periods or time for switching Tx chains and/or tuning RF components of the UE 120 during which the UE 120 cannot transmit and/or receive communications) over a short amount of time (e.g., fourteen consecutive OFDM symbols and/or one slot).

In some aspects, the base station 110 may determine the configuration based at least in part on a capability indicated by the UE 120, as described above. For example, the UE 120 may indicate that the UE 120 is capable of performing uplink transmit switching while performing SRS carrier switching. For example, the UE 120 may indicate that the UE 120 is configured with, or supports, multiple flexible Tx chains. Therefore, the UE 120 may be capable of switching one Tx chain from the second component carrier to the third component carrier (e.g., for an SRS carrier switching procedure) and switching another Tx chain from the second component carrier to the first component carrier (e.g., for an uplink transmit switching procedure) at the same time. Therefore, the base station 110 may determine that the UE 120 is enabled to perform uplink transmit switching while performing SRS carrier switching. For example, the configuration may indicate that the UE 120 is to perform an uplink transmit switching procedure at a time that at least partially overlaps with a time associated with an SRS carrier switching procedure (e.g., based at least in part on the capability indicated by the UE 120) so long as configuring both procedures satisfies a maximum number of active Tx chains supported by the UE 120. Therefore, the base station 110 may schedule (e.g., may transmit an indication to schedule) the UE 120 to perform uplink transmit switching at the same time as (or at a time that at least partially overlaps with) an SRS carrier switching procedure.

In some aspects, the base station 110 may determine the configuration based at least in part on the indicated number of switches that can be supported by the UE 120. For example, as described above, the UE 120 may be capable of supporting more than the maximum number of allowable switches over the amount time. The UE 120 may indicate the number of switches that the UE 120 is capable of performing over the amount of time (e.g., as described above in connection with reference number 705). For example, the UE 120 may indicate a capability to support more than three switches over the amount of time. In some aspects, the UE 120 may indicate a capability to support two uplink transmit switches and one SRS switch over the amount of time.

Therefore, the base station 110 may determine that the UE 120 can be configured with more than the maximum number of allowable switches over the amount of time (e.g., as defined, or otherwise fixed, by a wireless communication standard, such as a 3GPP Specification). For example, the base station 110 may determine that the UE 120 may be configured with two uplink transmit switches and one SRS carrier switch over the amount of time (e.g., fourteen consecutive OFDM symbols and/or one slot) based at least in part on the capability indicated by the UE 120.

As shown by reference number 715, the base station 110 may transmit, and the UE 120 may receive, the configuration information indicating the uplink transmit switching configuration and the SRS carrier switching configuration. As described above, the configuration information may be associated with, or based at least in part on, the one or more rules and/or one or more restrictions described above. For example, the configuration information may be associated with, or based at least in part on, a maximum number of allowable switches over an amount of time and/or that the third component carrier is to be treated as a two port configuration (e.g., a two antenna port configuration, a two SRS port configuration, and/or a two Tx chain configuration) for SRS carrier switching, among other examples. The configuration information may indicate an uplink transmit switching procedure and/or an SRS carrier switching procedure to be performed by the UE 120.

As shown by reference number 720, the UE 120 may transmit, and the base station 110 may receive, one or more signals associated with performing at least one of uplink transmit switching or SRS carrier switching. For example, the UE 120 may transmit the one or more signals based at least in part on receiving the configuration information from the base station 110. In some aspects, the UE 120 may perform one or more switches (e.g., within the maximum number of switches allowed or within the number of switches supported by the UE 120) over an amount of time (e.g., fourteen consecutive OFDM symbols and/or one slot). For example, the UE 120 may perform an uplink transmit switch and may transmit an uplink signal (e.g., on the first component carrier or the second component carrier). In some aspects, the UE 120 may perform an SRS carrier switch and may transmit an SRS on the third component carrier.

As a result, the UE 120 may be configured with a maximum number of switches when the UE 120 is configured with both an uplink transmit switching configuration and an SRS carrier switching configuration. This reduces a switching overhead of the UE 120 and conserves network resources. Additionally, or alternatively, the configuration may ensure that the UE 120 is not configured to perform uplink transmit switching during a time associated with SRS carrier switching. As a result, the UE 120 may not be configured to transmit uplink communications on one component carrier that would have otherwise been dropped or failed to transmit due to the UE 120 performing SRS carrier switching on another component carrier.

As indicated above, FIG. 7 is provided as an example. Other examples may differ from what is described with respect to FIG. 7.

FIG. 8 is a diagram illustrating an example process 800 performed, for example, by a UE, in accordance with the present disclosure. Example process 800 is an example where the UE (e.g., UE 120) performs operations associated with a configuration for uplink transmit switching and SRS carrier switching.

As shown in FIG. 8, in some aspects, process 800 may include receiving configuration information that indicates an uplink transmit switching configuration for performing uplink transmit switching between a first component carrier and a second component carrier and an SRS carrier switching configuration for performing SRS carrier switching between the second component carrier and a third component carrier, wherein the configuration information is associated with a maximum number of allowable switches over an amount of time (block 810). For example, the UE (e.g., using reception component 1002, depicted in FIG. 10) may receive configuration information that indicates an uplink transmit switching configuration for performing uplink transmit switching between a first component carrier and a second component carrier and an SRS carrier switching configuration for performing SRS carrier switching between the second component carrier and a third component carrier, wherein the configuration information is associated with a maximum number of allowable switches over an amount of time, as described above.

As further shown in FIG. 8, in some aspects, process 800 may include transmitting, based at least in part on the configuration information, one or more signals associated with performing at least one of uplink transmit switching or SRS carrier switching (block 820). For example, the UE (e.g., using transmission component 1004, depicted in FIG. 10) may transmit, based at least in part on the configuration information, one or more signals associated with performing at least one of uplink transmit switching or SRS carrier switching, as described above.

Process 800 may include additional aspects, such as any single aspect or any combination of aspects described below and/or in connection with one or more other processes described elsewhere herein.

In a first aspect, the maximum number of allowable switches over the amount of time is associated with a number of at least one of: uplink transmit switches between the first component carrier and the second component carrier, or SRS carrier switches between the second component carrier and the third component carrier, wherein an SRS carrier switch includes an RF tuning time and an RF retuning time.

In a second aspect, alone or in combination with the first aspect, the maximum number of allowable switches over the amount of time is three switches.

In a third aspect, alone or in combination with one or more of the first and second aspects, the three switches include one uplink transmit switch and two RF tunings associated with SRS carrier switching.

In a fourth aspect, alone or in combination with one or more of the first through third aspects, the amount of time is associated with a number of symbols.

In a fifth aspect, alone or in combination with one or more of the first through fourth aspects, the amount of time is associated with fourteen consecutive symbols.

In a sixth aspect, alone or in combination with one or more of the first through fifth aspects, the amount of time is associated with one slot.

In a seventh aspect, alone or in combination with one or more of the first through sixth aspects, the amount of time is based at least in part on a symbol duration of a component carrier, among the first component carrier, the second component carrier, or the third component carrier, with a lowest subcarrier spacing.

In an eighth aspect, alone or in combination with one or more of the first through seventh aspects, the maximum number of allowable switches over the amount of time is associated with a maximum number of uplink transmit switches between the first component carrier and the second component carrier over the amount of time.

In a ninth aspect, alone or in combination with one or more of the first through eighth aspects, the maximum number of uplink transmit switches is one.

In a tenth aspect, alone or in combination with one or more of the first through ninth aspects, process 800 includes transmitting a capability message indicating a number of switches that the UE is capable of performing over the amount of time.

In an eleventh aspect, alone or in combination with one or more of the first through tenth aspects, transmitting the capability message comprises transmitting an indication of at least one of a capability to support more than three switches over the amount of time, or a capability to support two uplink transmit switches and one SRS switch over the amount of time.

In a twelfth aspect, alone or in combination with one or more of the first through eleventh aspects, receiving the configuration information comprises receiving an indication that the third component carrier is associated with two ports for SRS carrier switching.

In a thirteenth aspect, alone or in combination with one or more of the first through twelfth aspects, the configuration does not schedule the UE to perform uplink transmit switching while performing SRS carrier switching within the amount of time.

In a fourteenth aspect, alone or in combination with one or more of the first through thirteenth aspects, process 800 includes receiving an indication that uplink transmit switching is scheduled to occur at a same time as SRS carrier switching; and detecting an error event based at least in part on receiving the indication that uplink transmit switching is scheduled to occur at the same time as SRS carrier switching.

In a fifteenth aspect, alone or in combination with one or more of the first through fourteenth aspects, process 800 includes transmitting a capability message indicating that the UE is capable of performing uplink transmit switching while performing SRS carrier switching.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a base station, in accordance with the present disclosure. Example process 900 is an example where the base station (e.g., base station 110) performs operations associated with a configuration for uplink transmit switching and SRS carrier switching.

As shown in FIG. 9, in some aspects, process 900 may include determining, for a UE, a configuration that includes an uplink transmit switching configuration for performing uplink transmit switching between a first component carrier of the UE and a second component carrier of the UE and an SRS carrier switching configuration for performing SRS carrier switching between the second component carrier of the UE and a third component carrier of the UE, wherein the configuration is associated with a maximum number of allowable switches over an amount of time (block 910). For example, the base station (e.g., using determination component 1108, depicted in FIG. 11) may determine, for a UE, a configuration that includes an uplink transmit switching configuration for performing uplink transmit switching between a first component carrier of the UE and a second component carrier of the UE and an SRS carrier switching configuration for performing SRS carrier switching between the second component carrier of the UE and a third component carrier of the UE, wherein the configuration is associated with a maximum number of allowable switches over an amount of time, as described above.

As further shown in FIG. 9, in some aspects, process 900 may include transmitting, to the UE, an indication of the configuration (block 920). For example, the base station (e.g., using transmission component 1104, depicted in FIG. 11) may transmit, to the UE, an indication of the configuration, as described above.

As further shown in FIG. 9, in some aspects, process 900 may include receiving, from the UE, one or more signals associated with at least one of uplink transmit switching or SRS carrier switching based at least in part on transmitting the indication of the configuration (block 930). For example, the base station (e.g., using reception component 1102, depicted in FIG. 11) may receive, from the UE, one or more signals associated with at least one of uplink transmit switching or SRS carrier switching based at least in part on transmitting the indication of the configuration, as described above.

Process 900 may include additional aspects, such as any single aspect or any combination of aspects described below and/or in connection with one or more other processes described elsewhere herein.

In a first aspect, determining the configuration comprises determining a number of switches that the UE is to perform over the amount of time, such that the number of switches does not exceed the maximum number of allowable switches over the amount of time, wherein the switches that the UE is to perform include at least one of uplink transmit switching or SRS carrier switching.

In a second aspect, alone or in combination with the first aspect, the maximum number of allowable switches over the amount of time is associated with a number of at least one of: uplink transmit switches between the first component carrier and the second component carrier, or SRS carrier switches between the second component carrier and the third component carrier, wherein an SRS carrier switch includes an RF tuning time and an RF retuning time.

In a third aspect, alone or in combination with one or more of the first and second aspects, the maximum number of allowable switches over the amount of time is three switches.

In a fourth aspect, alone or in combination with one or more of the first through third aspects, the three switches include one uplink transmit switch and two RF tunings associated with SRS carrier switching.

In a fifth aspect, alone or in combination with one or more of the first through fourth aspects, the amount of time is associated with a number of symbols.

In a sixth aspect, alone or in combination with one or more of the first through fifth aspects, the amount of time is associated with fourteen consecutive symbols.

In a seventh aspect, alone or in combination with one or more of the first through sixth aspects, the amount of time is associated with one slot.

In an eighth aspect, alone or in combination with one or more of the first through seventh aspects, the amount of time is based at least in part on a symbol duration of a component carrier, among the first component carrier, the second component carrier, or the third component carrier, with a lowest subcarrier spacing.

In a ninth aspect, alone or in combination with one or more of the first through eighth aspects, the maximum number of allowable switches over the amount of time is associated with a maximum number of uplink transmit switches between the first component carrier and the second component carrier over the amount of time.

In a tenth aspect, alone or in combination with one or more of the first through ninth aspects, the maximum number of uplink transmit switches is one.

In an eleventh aspect, alone or in combination with one or more of the first through tenth aspects, process 900 includes receiving, from the UE, a capability message indicating a number of switches that the UE is capable of performing over the amount of time.

In a twelfth aspect, alone or in combination with one or more of the first through eleventh aspects, process 900 includes determining a number of switches for the UE based at least in part on the number of switches that the UE is capable of performing over the amount of time.

In a thirteenth aspect, alone or in combination with one or more of the first through twelfth aspects, receiving the capability message comprises receiving an indication of at least one of: a capability of the UE to support more than three switches over the amount of time, or a capability of the UE to support two uplink transmit switches and one SRS switch over the amount of time.

In a fourteenth aspect, alone or in combination with one or more of the first through thirteenth aspects, transmitting the indication of the configuration comprises transmitting an indication that the third component carrier is associated with two ports for SRS carrier switching.

In a fifteenth aspect, alone or in combination with one or more of the first through fourteenth aspects, the configuration does not schedule the UE to perform uplink transmit switching while the UE is scheduled to perform SRS carrier switching within the amount of time.

In a sixteenth aspect, alone or in combination with one or more of the first through fifteenth aspects, process 900 includes receiving a capability message indicating that the UE is capable of performing uplink transmit switching while performing SRS carrier switching.

In a seventeenth aspect, alone or in combination with one or more of the first through sixteenth aspects, process 900 includes transmitting an indication to schedule the UE to perform uplink transmit switching at a same time that the UE is scheduled to perform SRS carrier switching.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
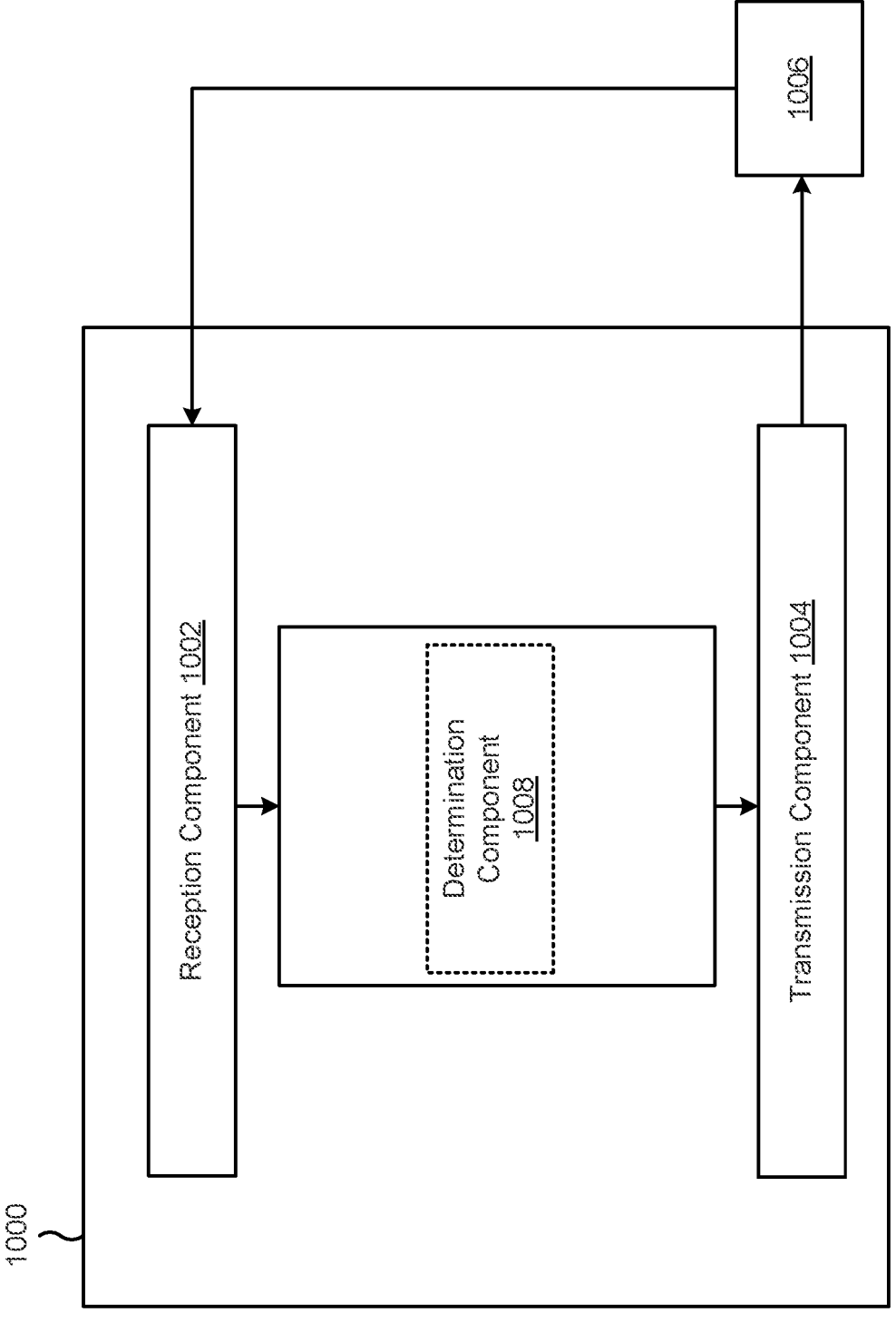
FIGS. 10 and 11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIG. 7. Additionally. or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive configuration information that indicates an uplink transmit switching configuration for performing uplink transmit switching between a first component carrier and a second component carrier and an SRS carrier switching configuration for performing SRS carrier switching between the second component carrier and a third component carrier, wherein the configuration information is associated with a maximum number of allowable switches over an amount of time. The transmission component 1004 may transmit, based at least in part on the configuration information, one or more signals associated with performing at least one of uplink transmit switching or SRS carrier switching.

The transmission component 1004 may transmit a capability message indicating a number of switches that the UE is capable of performing over the amount of time. The transmission component 1004 may transmit a capability message indicating that the UE is capable of performing uplink transmit switching while performing SRS carrier switching.

The determination component 1008 may determine a capability of the UE associated with at least one of uplink transmit switching or SRS carrier switching.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
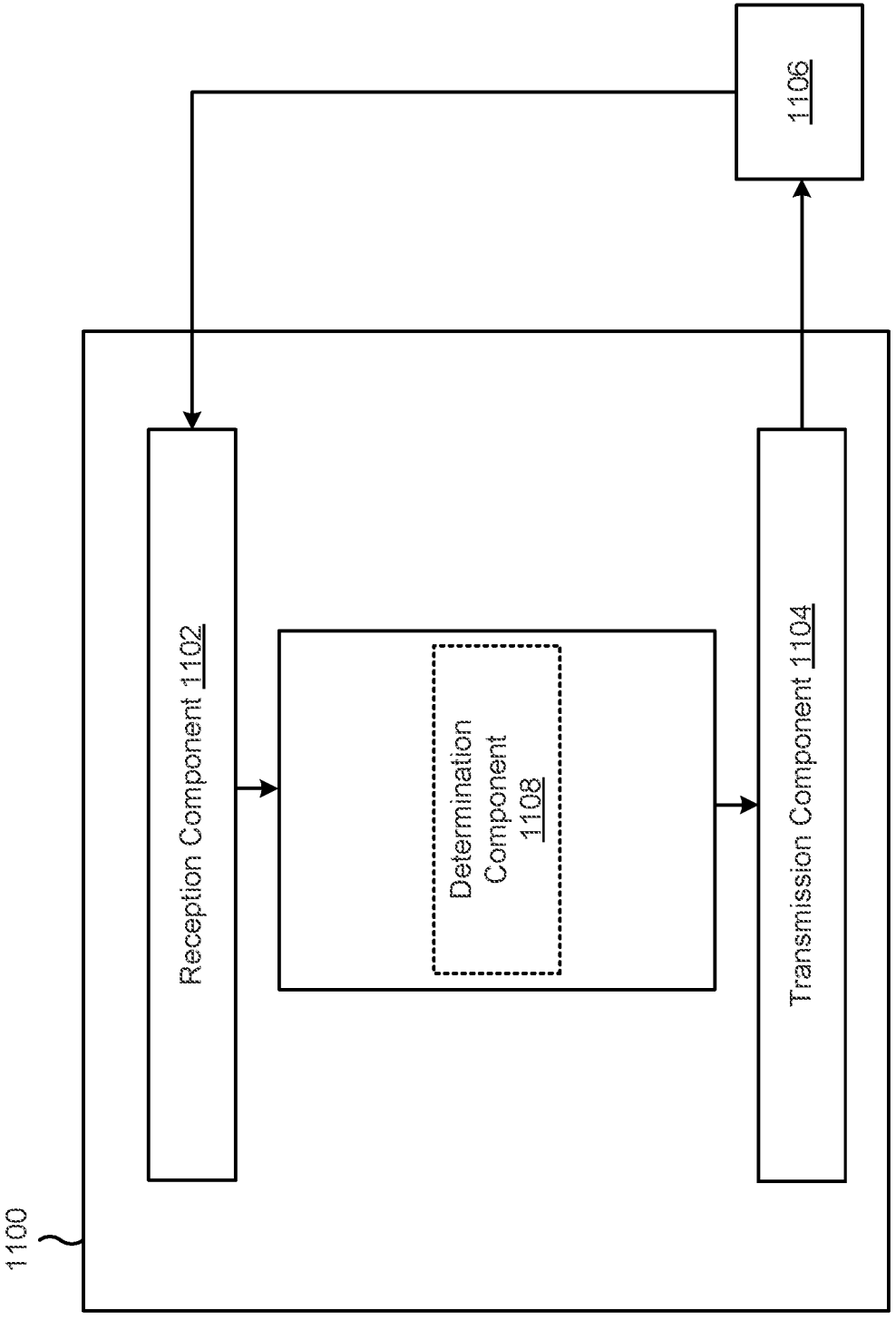

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The determination component 1108 may determine, for a UE, a configuration that includes an uplink transmit switching configuration for performing uplink transmit switching between a first component carrier of the UE and a second component carrier of the UE and an SRS carrier switching configuration for performing SRS carrier switching between the second component carrier of the UE and a third component carrier of the UE, wherein the configuration is associated with a maximum number of allowable switches over an amount of time. The transmission component 1104 may transmit, to the UE, an indication of the configuration. The reception component 1102 may receive, from the UE, one or more signals associated with at least one of uplink transmit switching or SRS carrier switching based at least in part on transmitting the indication of the configuration.

The reception component 1102 may receive, from the UE, a capability message indicating a number of switches that the UE is capable of performing over the amount of time. The determination component 1108 may determine a number of switches for the UE based at least in part on the number of switches that the UE is capable of performing over the amount of time. The reception component 1102 may receive a capability message indicating that the UE is capable of performing uplink transmit switching while performing SRS carrier switching.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving configuration information that indicates an uplink transmit switching configuration for performing uplink transmit switching between a first component carrier and a second component carrier and a sounding reference signal (SRS) carrier switching configuration for performing SRS carrier switching between the second component carrier and a third component carrier, wherein the configuration information is associated with a maximum number of allowable switches over an amount of time; and transmitting, based at least in part on the configuration information, one or more signals associated with performing at least one of uplink transmit switching or SRS carrier switching.

Aspect 2: The method of Aspect 1, wherein the maximum number of allowable switches over the amount of time is associated with a number of at least one of: uplink transmit switches between the first component carrier and the second component carrier, or SRS carrier switches between the second component carrier and the third component carrier, wherein an SRS carrier switch includes a radio frequency (RF) tuning time and an RF retuning time.

Aspect 3: The method of any of Aspects 1-2, wherein the maximum number of allowable switches over the amount of time is three switches.

Aspect 4: The method of Aspect 3, wherein the three switches include one uplink transmit switch and two radio frequency (RF) tunings associated with SRS carrier switching.

Aspect 5: The method of any of Aspects 1-4, wherein the amount of time is associated with a number of symbols.

Aspect 6: The method of any of Aspects 1-5, wherein the amount of time is associated with fourteen consecutive symbols.

Aspect 7 The method of any of Aspects 1-6, wherein the amount of time is associated with one slot.

Aspect 8: The method of any of Aspects 1-7, wherein the amount of time is based at least in part on a symbol duration of a component carrier, among the first component carrier, the second component carrier, or the third component carrier, with a lowest subcarrier spacing.

Aspect 9: The method of any of Aspects 1-8, wherein the maximum number of allowable switches over the amount of time is associated with a maximum number of uplink transmit switches between the first component carrier and the second component carrier over the amount of time.

Aspect 10: The method of Aspect 9, wherein the maximum number of uplink transmit switches is two.

Aspect 11: The method of any of Aspects 1-10, further comprising: transmitting a capability message indicating a number of switches that the UE is capable of performing over the amount of time.

Aspect 12: The method of Aspect 11, wherein transmitting the capability message comprises: transmitting an indication of at least one of: a capability to support more than three switches over the amount of time, or a capability to support two uplink transmit switches and one SRS switch over the amount of time.

Aspect 13: The method of any of Aspects 1-12, wherein receiving the configuration information comprises: receiving an indication that the third component carrier is associated with two ports for SRS carrier switching.

Aspect 14: The method of any of Aspects 1-13, wherein the configuration does not schedule the UE to perform uplink transmit switching while performing SRS carrier switching within the amount of time.

Aspect 15: The method of Aspect 14, further comprising: receiving an indication that uplink transmit switching is scheduled to occur at a same time as SRS carrier switching; and detecting an error event based at least in part on receiving the indication that uplink transmit switching is scheduled to occur at the same time as SRS carrier switching.

Aspect 16: The method of any of Aspects 1-15, further comprising: transmitting a capability message indicating that the UE is capable of performing uplink transmit switching while performing SRS carrier switching.

Aspect 17: A method of wireless communication performed by a base station, comprising: determining, for a user equipment (UE), a configuration that includes an uplink transmit switching configuration for performing uplink transmit switching between a first component carrier of the UE and a second component carrier of the UE and a sounding reference signal (SRS) carrier switching configuration for performing SRS carrier switching between the second component carrier of the UE and a third component carrier of the UE, wherein the configuration is associated with a maximum number of allowable switches over an amount of time; transmitting, to the UE, an indication of the configuration; and receiving, from the UE, one or more signals associated with at least one of uplink transmit switching or SRS carrier switching based at least in part on transmitting the indication of the configuration.

Aspect 18: The method of Aspect 17, wherein determining the configuration comprises: determining a number of switches that the UE is to perform over the amount of time, such that the number of switches does not exceed the maximum number of allowable switches over the amount of time, wherein the switches that the UE is to perform include at least one of uplink transmit switching or SRS carrier switching.

Aspect 19: The method of any of Aspects 17-18, wherein the maximum number of allowable switches over the amount of time is associated with a number of at least one of: uplink transmit switches between the first component carrier and the second component carrier, or SRS carrier switches between the second component carrier and the third component carrier, wherein an SRS carrier switch includes a radio frequency (RF) tuning time and an RF retuning time.

Aspect 20: The method of any of Aspects 17-19, wherein the maximum number of allowable switches over the amount of time is three switches.

Aspect 21: The method of Aspect 20, wherein the three switches include one uplink transmit switch and two radio frequency (RF) tunings associated with SRS carrier switching.

Aspect 22: The method of any of Aspects 17-21, wherein the amount of time is associated with a number of symbols.

Aspect 23: The method of any of Aspects 17-22, wherein the amount of time is associated with fourteen consecutive symbols.

Aspect 24: The method of any of Aspects 17-23, wherein the amount of time is associated with one slot.

Aspect 25: The method of any of Aspects 17-24, wherein the amount of time is based at least in part on a symbol duration of a component carrier, among the first component carrier, the second component carrier, or the third component carrier, with a lowest subcarrier spacing.

Aspect 26: The method of any of Aspects 17-25, wherein the maximum number of allowable switches over the amount of time is associated with a maximum number of uplink transmit switches between the first component carrier and the second component carrier over the amount of time.

Aspect 27: The method of Aspect 26, wherein the maximum number of uplink transmit switches is two.

Aspect 28: The method of any of Aspects 17-27, further comprising: receiving, from the UE, a capability message indicating a number of switches that the UE is capable of performing over the amount of time.

Aspect 29: The method of Aspect 28, further comprising: determining a number of switches for the UE based at least in part on the number of switches that the UE is capable of performing over the amount of time.

Aspect 30: The method of any of Aspects 28-29, wherein receiving the capability message comprises: receiving an indication of at least one of: a capability of the UE to support more than three switches over the amount of time, or a capability of the UE to support two uplink transmit switches and one SRS switch over the amount of time.

Aspect 31: The method of any of Aspects 17-30, wherein transmitting the indication of the configuration comprises: transmitting an indication that the third component carrier is associated with two ports for SRS carrier switching.

Aspect 32: The method of any of Aspects 17-31, wherein the configuration does not schedule the UE to perform uplink transmit switching while the UE is scheduled to perform SRS carrier switching within the amount of time.

Aspect 33: The method of any of Aspects 17-32, further comprising: receiving a capability message indicating that the UE is capable of performing uplink transmit switching while performing SRS carrier switching.

Aspect 34: The method of Aspect 33, further comprising: transmitting an indication to schedule the UE to perform uplink transmit switching at a same time that the UE is scheduled to perform SRS carrier switching.

Aspect 35: An apparatus for wireless communication at a device, comprising a processor; memory coupled with the processor, and instructions stored in the memory and executable by the processor to cause the apparatus to perform the method of one or more Aspects of Aspects 1-16.

Aspect 36: A device for wireless communication, comprising a memory and one or more processors coupled to the memory, the memory and the one or more processors configured to perform the method of one or more Aspects of Aspects 1-16.

Aspect 37: An apparatus for wireless communication, comprising at least one means for performing the method of one or more Aspects of Aspects 1-16.

Aspect 38: A non-transitory computer-readable medium storing code for wireless communication, the code comprising instructions executable by a processor to perform the method of one or more Aspects of Aspects 1-16.

Aspect 39: A non-transitory computer-readable medium storing a set of instructions for wireless communication, the set of instructions comprising one or more instructions that, when executed by one or more processors of a device, cause the device to perform the method of one or more Aspects of Aspects 1-16.

Aspect 40: An apparatus for wireless communication at a device, comprising a processor, memory coupled with the processor, and instructions stored in the memory and executable by the processor to cause the apparatus to perform the method of one or more Aspects of Aspects 17-34.

Aspect 41: A device for wireless communication, comprising a memory and one or more processors coupled to the memory, the memory and the one or more processors configured to perform the method of one or more Aspects of Aspects 17-34.

Aspect 42: An apparatus for wireless communication, comprising at least one means for performing the method of one or more Aspects of Aspects 17-34.

Aspect 43: A non-transitory computer-readable medium storing code for wireless communication, the code comprising instructions executable by a processor to perform the method of one or more Aspects of Aspects 17-34.

Aspect 44: A non-transitory computer-readable medium storing a set of instructions for wireless communication, the set of instructions comprising one or more instructions that, when executed by one or more processors of a device, cause the device to perform the method of one or more Aspects of Aspects 17-34.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have." "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE), comprising:
a transceiver;
one or more memories comprising instructions; and
one or more processors configured to execute the instructions to cause the UE to:
    receive, via the transceiver, configuration information that indicates an uplink transmit switching configuration associated with performing uplink transmit switching between a first component carrier and a second component carrier and a sounding reference signal (SRS) carrier switching configuration associated with performing SRS carrier switching between the second component carrier and a third component carrier, wherein the configuration information is associated with a maximum number of allowable switches over an amount of time; and
    transmit, via the transceiver, one or more signals associated with performing at least one of the uplink transmit switching or the SRS carrier switching.

2. The UE of claim 1, wherein the maximum number of allowable switches over
    the amount of time is associated with a number of at least one of:
    uplink transmit switches between the first component carrier and the second component carrier, or
    SRS carrier switches between the second component carrier and the third component carrier, wherein an SRS carrier switch includes a radio frequency (RF) tuning time and an RF retuning time.

3. The UE of claim 1, wherein the maximum number of allowable switches over the amount of time is three switches.

4. The UE of claim 3, wherein the three switches include one uplink transmit switch and two radio frequency (RF) tunings associated with SRS carrier switching.

5. The UE of claim 1, wherein the amount of time is associated with a number of symbols.

6. The UE of claim 1, wherein the amount of time is associated with fourteen consecutive symbols.

7. The UE of claim 1, wherein the amount of time is associated with one slot.

8. The UE of claim 1, wherein the amount of time is based at least in part on a symbol duration of a component carrier, among the first component carrier, the second component carrier, or the third component carrier, with a lowest sub-carrier spacing.

9. The UE of claim 1, wherein the maximum number of allowable switches over the amount of time is associated with a maximum number of uplink transmit switches between the first component carrier and the second component carrier over the amount of time.

10. The UE of claim 9, wherein the maximum number of uplink transmit switches is one.

11. The UE of claim 1, wherein the one or more processors are further configured to cause the UE to:
    transmit, via the transceiver, a capability message indicating a number of switches that the UE is capable of performing over the amount of time.

12. The UE of claim 11, wherein the one or more processors are further configured to cause the UE to:
    transmit, via the transceiver, an indication of at least one of:
        a capability to support more than three switches over the amount of time, or
        a capability to support two uplink transmit switches and one SRS switch over the amount of time.

13. The UE of claim 1, wherein the one or more processors are further configured to cause the UE to:
    receive, via the transceiver, an indication that the third component carrier is associated with two ports for SRS carrier switching.

14. The UE of claim 1, wherein the configuration does not schedule
    the UE to perform the uplink transmit switching while performing the SRS carrier switching within the amount of time.

15. The UE of claim 14, wherein the one or more processors are further configured to cause the UE to:
    receive, via the transceiver, an indication that the uplink transmit switching is scheduled to occur at a same time as the SRS carrier switching; and
    detect an error event based at least in part on receiving the indication that the uplink transmit switching is scheduled to occur at the same time as the SRS carrier switching.

16. The UE of claim 1, wherein the one or more processors are further configured to cause the UE to:

transmit a capability message indicating that the UE is capable of performing the uplink transmit switching while performing the SRS carrier switching.

17. A network node, comprising:

a transceiver;

one or more memories comprising instructions; and one or more processors configured to execute the instructions to cause the network node to:

transmit, for the UE via the transceiver, an indication of a configuration that includes an uplink transmit switching configuration associated with performing uplink transmit switching between a first component carrier of the UE and a second component carrier of the UE and a sounding reference signal (SRS) carrier switching configuration associated with performing SRS carrier switching between the second component carrier of the UE and a third component carrier of the UE, wherein the configuration is associated with a maximum number of allowable switches over an amount of time; and receive, from the UE via the transceiver, one or more signals associated with at least one of the uplink transmit switching or the SRS carrier switching.

18. The network node of claim 17, wherein the configuration indicates a number of switches that the UE is to perform over the amount of time, such that the number of switches does not exceed the maximum number of allowable switches over the amount of time, wherein the switches that the UE is to perform include at least one of the uplink transmit switching or the SRS carrier switching.

19. The network node of claim 17, wherein the maximum number of allowable switches over the amount of time is associated with a number of at least one of:

uplink transmit switches between the first component carrier and the second component carrier, or SRS carrier switches between the second component carrier and the third component carrier, wherein an SRS carrier switch includes a radio frequency (RF) tuning time and an RF retuning time.

20. The network node of claim 17, wherein the maximum number of allowable switches over the amount of time is three switches.

21. The network node of claim 20, wherein the three switches include one uplink transmit switch and two radio frequency (RF) tunings associated with SRS carrier switching.

22. The network node of claim 17, wherein the amount of time is associated with a number of symbols.

23. The network node of claim 17, wherein the amount of time is associated with fourteen consecutive symbols.

24. The network node of claim 17, wherein the amount of time is associated with one slot.

25. The network node of claim 17, wherein the amount of time is based at least in part on a symbol duration of a component carrier, among the first component carrier, the second component carrier, or the third component carrier, with a lowest subcarrier spacing.

26. The network node of claim 17, wherein the maximum number of allowable switches over the amount of time is associated with a maximum number of uplink transmit switches between the first component carrier and the second component carrier over the amount of time.

27. The network node of claim 26, wherein the maximum number of uplink transmit switches is one.

28. The network node of claim 17, wherein the one or more processors are further configured to cause the network node to:

receive, via the transceiver and from the UE, a capability message indicating a number of switches that the UE is capable of performing over the amount of time.

29. The network node of claim 28, wherein the configuration indicates a number of switches for the UE based at least in part on the number of switches that the UE is capable of performing over the amount of time.

30. The network node of claim 17, wherein the one or more processors are configured to cause the network node to:

receive, via the transceiver, an indication of at least one of:

a capability of the UE to support more than three switches over the amount of time, or a capability of the UE to support two uplink transmit switches and one SRS switch over the amount of time.

31. The network node of claim 17, wherein the one or more processors are further configured to cause the network node to:

transmit, via the transceiver, an indication that the third component carrier is associated with two ports for SRS carrier switching.

32. The network node of claim 17, wherein the configuration does not schedule the UE to perform the uplink transmit switching while the UE is scheduled to perform the SRS carrier switching within the amount of time.

33. The network node of claim 17, wherein the one or more processors are further configured to cause the network node to:

receive, via the transceiver, a capability message indicating that the UE is capable of performing the uplink transmit switching while performing the SRS carrier switching.

34. The network node of claim 17, wherein the one or more processors are further configured to cause the network node to:

transmit, via the transceiver, an indication to schedule the UE to perform the uplink transmit switching at a same time that the UE is scheduled to perform the SRS carrier switching.

35. A method of wireless communication performed by a user equipment (UE), comprising:

receiving configuration information that indicates an uplink transmit switching configuration associated with performing uplink transmit switching between a first component carrier and a second component carrier and a sounding reference signal (SRS) carrier switching configuration associated with performing SRS carrier switching between the second component carrier and a third component carrier, wherein the configuration information is associated with a maximum number of allowable switches over an amount of time; and transmitting, based at least in part on the configuration information, one or more signals associated with performing at least one of the uplink transmit switching or the SRS carrier switching.

* * * * *